United States Patent
Ikedo et al.

(10) Patent No.: US 8,739,054 B2
(45) Date of Patent: May 27, 2014

(54) LABEL DATA CREATING APPARATUS, LABEL DATA CREATING METHOD, AND COMPUTER PROGRAM PRODUCT

(75) Inventors: Tatsuhiro Ikedo, Ena (JP); Mikitoshi Suzuki, Hazu-gun (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1107 days.

(21) Appl. No.: 12/286,996

(22) Filed: Oct. 3, 2008

(65) Prior Publication Data

US 2009/0138812 A1    May 28, 2009

(30) Foreign Application Priority Data

Oct. 4, 2007 (JP) .................. 2007-260556

(51) Int. Cl.
*G06F 3/048* (2013.01)
(52) U.S. Cl.
USPC ............ 715/769; 715/243; 715/273; 715/731
(58) Field of Classification Search
USPC ................ 715/804, 769, 531, 243, 273, 731
See application file for complete search history.

(56) References Cited

U.S. PATENT DOCUMENTS

| | | | |
|---|---|---|---|
| 5,760,773 A | 6/1998 | Berman et al. | |
| 5,767,851 A | 6/1998 | Yee et al. | |
| 7,021,844 B2 * | 4/2006 | Tanaka et al. | 400/61 |
| 7,475,361 B2 * | 1/2009 | Ito | 715/804 |
| 2002/0089546 A1 * | 7/2002 | Kanevsky et al. | 345/800 |
| 2003/0169296 A1 | 9/2003 | Ito | |
| 2004/0056896 A1 | 3/2004 | Doblmayr et al. | |
| 2004/0205629 A1 | 10/2004 | Rosenholtz et al. | |
| 2005/0099407 A1 | 5/2005 | Pennington, II et al. | |
| 2005/0147398 A1 * | 7/2005 | Anderson et al. | 386/125 |
| 2006/0048069 A1 | 3/2006 | Igeta | |
| 2006/0112333 A1 * | 5/2006 | Iwanaga | 715/531 |
| 2007/0195337 A1 | 8/2007 | Takayama et al. | |

FOREIGN PATENT DOCUMENTS

| | | |
|---|---|---|
| EP | 1313007 A1 | 5/2003 |
| JP | 06-202863 | 7/1994 |
| JP | 08-339281 | 12/1996 |
| JP | 2003-162532 | 6/2003 |
| JP | 2005-074725 | 3/2005 |
| JP | 2007-223122 | 9/2007 |
| WO | WO01/98890 | 12/2001 |
| WO | WO 02/27459 | 4/2002 |
| WO | 2004034278 | 4/2004 |
| WO | WO 2008/098823 | 8/2008 |

OTHER PUBLICATIONS

European Office Action issued in Application No. 08017402.2 on Dec. 10, 2013.

* cited by examiner

*Primary Examiner* — Sherrod Keaton
(74) *Attorney, Agent, or Firm* — McCarter & English, LLP

(57) ABSTRACT

In a case wherein a drop area of a capture window is clicked with a mouse and text is entered through a keyboard, a CPU of a computer device changes the drop area of a capture window to an edit area which displays text characters that were entered from the keyboard. The CPU changes the capture button to a print button used to enter a command for text printing. If the print button is clicked with the mouse, the CPU outputs the text which is displayed on the edit area to a tape printer as print data.

18 Claims, 17 Drawing Sheets

FIG. 9

| SHEET DISCRIMINATION SENSOR | ROLL SHEET TYPE |
|---|---|
| 110100 | 12mm NON-FIXED LENGTH |
| 110101 | 17mm NON-FIXED LENGTH |
| 110110 | 29mm NON-FIXED LENGTH |
| 110111 | 38mm NON-FIXED LENGTH |
| 111000 | 62mm NON-FIXED LENGTH |
| 111001 | 12mm DIE-CUT1 |
| 111010 | 29mm DIE-CUT1 |
| 111011 | 38mm DIE-CUT1 |
| 111100 | 62mm DIE-CUT1 |
| • | • |
| • | • |
| • | • |

FIG. 10

| DIE-CUT TYPE | WIDTH × LENGTH |
|---|---|
| 12mm DIE-CUT1 | 12mm × 54mm |
| 12mm DIE-CUT2 | 12mm × 90mm |
| 17mm DIE-CUT1 | 17mm × 54mm |
| 17mm DIE-CUT2 | 17mm × 90mm |
| 29mm DIE-CUT1 | 29mm × 90mm |
| 38mm DIE-CUT1 | 38mm × 90mm |
| 62mm DIE-CUT1 | 62mm × 29mm |
| 62mm DIE-CUT2 | 62mm × 100mm |
| • | • |
| • | • |
| • | • |

LABEL DATA CREATING APPARATUS, LABEL DATA CREATING METHOD, AND COMPUTER PROGRAM PRODUCT

CROSS-REFERENCE TO RELATED APPLICATIONS

The present application claims priority from Japanese Patent Application No. 2007-260556, filed Oct. 4, 2007, the disclosure of which is hereby incorporated by reference.

TECHNICAL FIELD

The disclosure relates to a label data creating apparatus, a label data creating method, and a computer program product for creating and editing print data to be printed on a long print medium.

BACKGROUND

Conventionally, various kinds of technologies have been suggested for creating and editing print data to be printed on a print medium such as a long tape or a rolled sheet or the like. For instance, image data (hereinafter referred to as [object]) of different formats such as GIF (graphics interchange format), JPEG (joint photographic experts group) or BMP (bit map format) which is displayed on a display area of a browser in a display device is dropped in the display area of an application software (assistant software) through a drag-and-drop operation. In one type of label data creating apparatus, when an object is dropped in a display area of the application software, the object can be inserted in the layout edit screen which is currently being edited and can be edited into label data (for example, the Japanese Unexamined Patent Publication No. WO2001/098890).

However, with the configuration disclosed in the Japanese Unexamined Patent Publication No. WO2001/098890 as described earlier, in case of creating and then printing label data including text only, while the application software is in an activated state, a tape editor is activated again in a visible manner and an operation to change the edit mode becomes necessary. Thus, the operation to enter text becomes cumbersome and complicated. Because the display area for the application software is formed to be small due to an increase in the size of the display device, there is a risk that this display area may be overlooked when displayed.

SUMMARY

The disclosure has been worked out in view of the above-described problems, and an object thereof is to provide a label data creating apparatus, a label data creating method and a computer program product which make it possible to create label data including only text through a simple operation while the application is in an activated state. A further object is to provide a label data creating apparatus, a label data creating method and a computer program product enabling easy recognition of a window that indicates the application is in an activated state.

To achieve the purpose of the disclosure, there is provided a label data creating apparatus comprising: a display having a display screen; an application storage device that stores an application to edit data including text or image information by inserting said data in a print area of a long print medium; a display control unit that performs control so that the display screen enabling a drag-and-drop operation of said data is displayed on the display, in a case where said application has been activated; a window display unit that displays a window showing said application has been activated, on said display screen, and at the same time, having a drop area formed therein for dragging and dropping said data; an input device that is used in inputting text; a change unit that changes said drop area to an edit area displaying text which was entered through the input device; and an output control unit that performs control so that text which was entered through the input device and was displayed on the edit area is outputted to a printer as print data, in a case where said drop area is changed to said edit area.

In the label data creating apparatus, label data including only text for printing on a long print medium can be created through a simple operation by changing the drop area of the window to an edit area, while the window is being displayed, specifically, while the application is in an activated state. Label data including text only is outputted to the printer as print data, making it possible to quickly create a label sheet onto which only text is printed, while the application is in an activated state.

To achieve the purpose of the disclosure, there is provided a label data creating apparatus comprising: a display having a display screen; an application storage device that stores an application for editing data including text or image information by inserting said data in a print area of a long print medium; a display control unit that performs control so that the display screen enabling a drag-and-drop operation of said data is displayed on the display, in a case where said application has been activated; a window display unit that displays a window on said display screen showing that said application has been activated; and a display state change unit that displays the display state of the window by switching said state by a predetermined number of times at least at the initial display of said window; and wherein if said data is dropped at a position at which the window is displayed, the dropped data is inserted in said print area which is currently being edited.

In the label data creating apparatus, the display state of the window is switched by a predetermined number of times at least when the window showing the activated state of the application is initially displayed. This enables a user to easily recognize this window, even if the window is small. Thus, data including text or image information can be inserted in the print area by dragging and dropping this data on the window.

To achieve the purpose of the disclosure, there is provided a label data creating method comprising: a display control step of performing control, in a case where an application of editing data including text or image data by inserting said data in a print area of a long print medium is activated, so that a display screen enabling a drag-and-drop operation of said data is displayed on a display; a window display step of displaying a window that shows said application has been activated, on said display screen displayed in said display control step, and has a drop area formed therein for dragging and dropping said data; a changing step of changing, in a case where text was entered through an input device, said drop area displayed in said window display step to an edit area displaying text which was entered through the input device; and an output control step of performing control, in a case where said drop area is changed into said edit area in said changing step, so that text which was entered through the input device and was displayed on said edit area is outputted to a printer as print data.

According to the label data creating method, when text is entered through the input device, label data including only text for printing onto the long print medium can be created through a simple operation, by changing the drop area of the window into an edit area, while the window is being displayed, specifically, while the application is in an activated state. The label data including text only is outputted to the printer as print data, making it possible to quickly create a label sheet onto which only text is printed, while the application is in an activated state.

To achieve the purpose of the disclosure, there is provided a label data creating method comprising: a display control step of performing control, in a case where an application of editing data including text or image data by inserting said data in a print area of a long print medium is activated, so that a display screen enabling a drag-and-drop operation of said data is displayed on a display; a window display step of displaying a window which shows that said application has been activated, on said display screen displayed in said display control step; a display state changing step of displaying a display state of said window by switching said state by a predetermined number of times at least when the window displayed in said window display step is initially displayed; and wherein if said data is dropped at a position at which said window is displayed in said window display step, the dropped data is inserted in said print area which is currently being edited.

According to the label data creating method, the display state of the window is switched by a predetermined number of times at least when the window showing the activated state of the application is initially displayed. This enables a user to easily recognize this window, even if the window is small. Thus, data including text or image information can be inserted in the print area by dragging and dropping this data on the window.

To achieve the purpose of the disclosure, there is provided a computer program product used and executed by a label data creating apparatus comprising: a computer readable recording medium; and a computer program stored in the computer readable recording medium, wherein the computer program includes: a display control step of performing control, in a case where an application of editing data including text or image data by inserting said data in a print area of a long print medium is activated, so that a display screen enabling a drag-and-drop operation of said data is displayed on a display; a window display step of displaying a window that shows said application has been activated, on said display screen displayed in said display control step, and has a drop area formed therein for dragging and dropping said data; a changing step of changing, in a case where text was entered through an input device, said drop area displayed in said window display step to an edit area displaying text which was entered through the input device; and an output control step of performing control, in a case where said drop area is changed into said edit area in said changing step, so that text which was entered through the input device and was displayed on said edit area is outputted to a printer as print data.

According to the computer program product, a window is displayed when a computer loads a program which is stored in the recording medium to activate the application for editing data including text or image information by inserting this data in a print area of the tape. This window has a drop area formed therein for dragging and dropping data including text or image information. If the drop area of the window is changed into edit area, the computer outputs the text which is entered through the input device and is displayed in the edit area to the printer, as print data.

As a result, it is possible to create label data including only text for printing on a long print medium through a simple operation by changing the drop area of the window into the edit area, while the window is being displayed, specifically, while the application is in an activated state. The label data including text only is outputted to the printer as print data, making it possible to quickly create a label sheet onto which only text is printed, while the application is in an activated state.

To achieve the purpose of the disclosure, there is provided a computer program product used and executed by a label data creating apparatus comprising: a computer readable recording medium; and a computer program stored in the computer readable recording medium, wherein the computer program includes: a display control step of performing control, in a case where an application of editing data including text or image data by inserting said data in a print area of a long print medium is activated, so that a display screen enabling a drag-and-drop operation of said data is displayed on a display; a window display step of displaying a window which shows that said application has been activated, on said display screen displayed in said display control step; a display state changing step of displaying a display state of said window by switching said state by a predetermined number of times at least when the window displayed in said window display step is initially displayed; and wherein if said data is dropped at a position at which said window is displayed in said window display step, the dropped data is inserted in said print area which is currently being edited.

According to the computer program product, a computer loads the program which is stored in the recording medium to activate the application for editing data including text or image information by inserting this data in a print area of the tape. In this case, the display state of the window is switched by a predetermined number of times at least when the window showing the activated state of the application is initially displayed. When the data including text or image information is dragged and dropped on this window, the computer inserts this data in the print area.

Thus, the display state of the window is switched by a predetermined number of times at least when the window showing the activated state of the application is initially displayed. This enables a user to easily recognize this window, even if the window is small. Thus, data including text or image information can be inserted in the print area by dragging and dropping this data on the window.

BRIEF DESCRIPTION OF THE DRAWINGS

FIG. 9 is a view showing one example of a sheet type table stored in the ROM of the tape printer;

FIG. 10 is a view showing one example of a die cut type table stored in the ROM of the tape printer;

DETAILED DESCRIPTION

A detailed description of one exemplary embodiment of a label data creating apparatus, a label data creating method, and a computer program product as applied to a label printing system according to the disclosure will now be given referring to the accompanying drawings.

Figure 1:
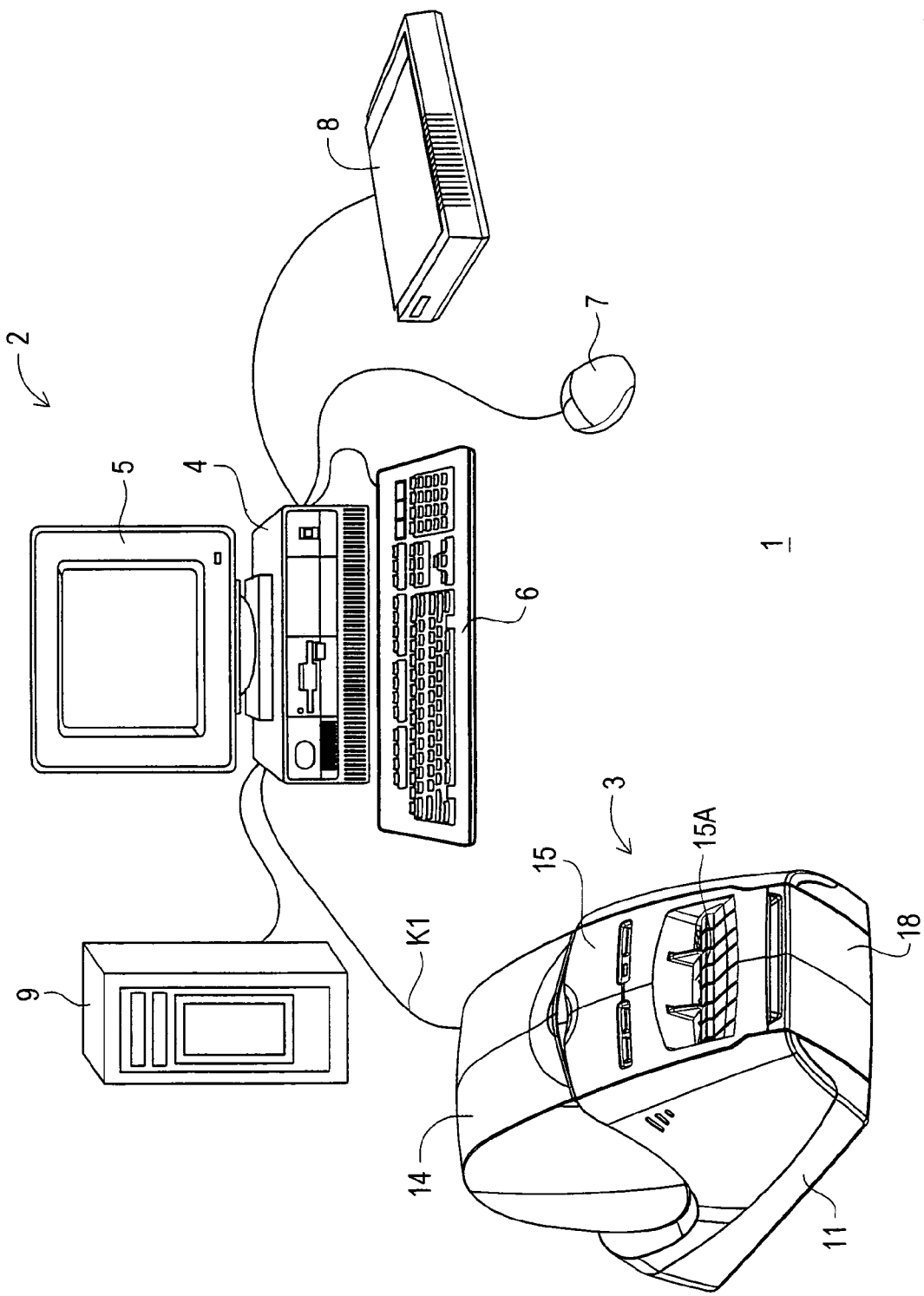
FIG. 1 shows a schematic configuration of a label printing system according to a preset embodiment.

First, a schematic configuration of a label printing system 1 according to the present embodiment will now be described based on FIG. 1. As shown in FIG. 1, the label printing system 1 according to this embodiment is composed of a computer device 2, given as one example of a label data creating apparatus and including a personal computer and the like; and a tape printer 3 connected to the computer device 2 through a signal cable K1.

The computer device 2 comprises a host controller 4, a display device (such as CRT, LCD and the like) 5, a keyboard 6, a mouse 7, an image scanner 8, and a CD-R/W drive 9. It is noted that the mouse 7 may be replaced with a joy stick or a track ball. CD-RW drive 9 may also be substituted by a MO device or a DVD device.

Next, a general configuration of a tape printer 3 will be described based on FIG. 2 through FIG. 5.

Figure 2:
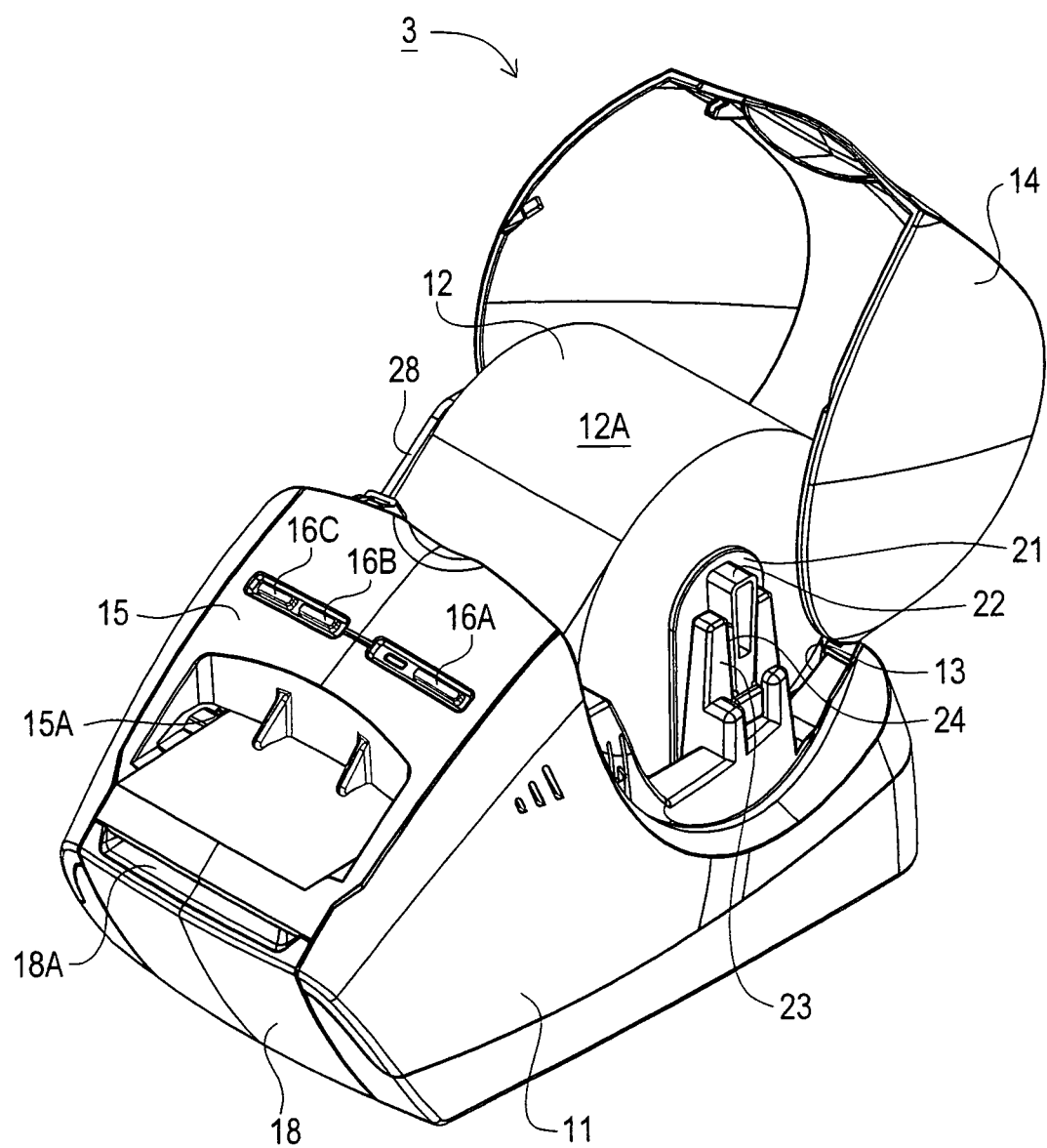
FIG. 2 is a perspective view taken from an upper right side of a tape printer as shown in FIG. 1, with a top cover thereof open, and a rolled sheet holder mounted therein.
Figure 5:
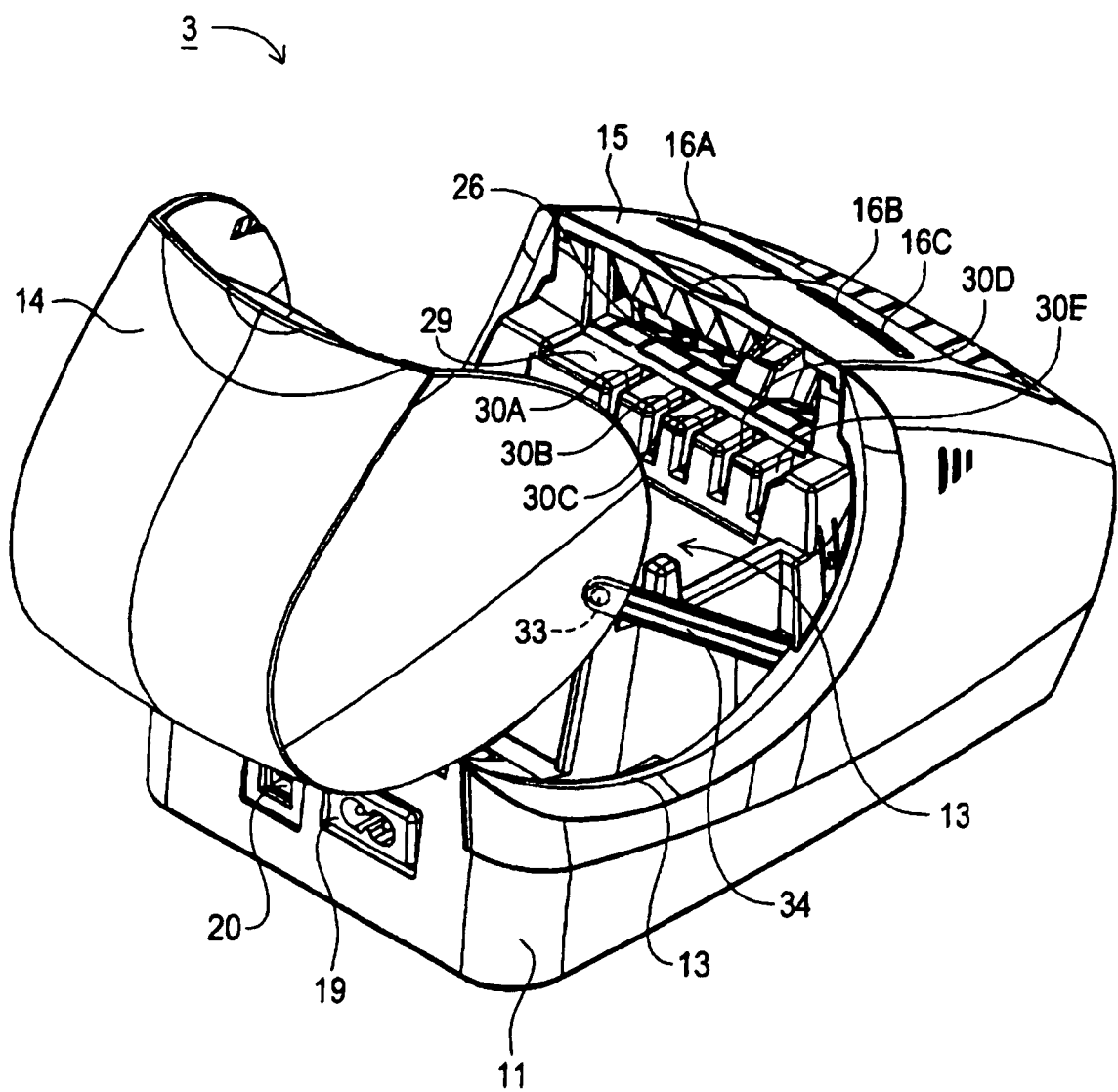
FIG. 5 is a perspective view taken from an upper left rear side of the tape printer, with the top cover thereof open.

As shown in FIG. 2 thorough FIG. 5, the tape printer 3 includes a resin body case 11, a rolled sheet holder 12, a rolled sheet holder housing section 13 and a top cover 14. The rolled sheet holder housing section 13 houses the rolled sheet holder 12 having rolled sheet 12A of a predetermined width wound thereon. The top cover 14 is made of a transparent resin and is formed in a substantially semicircular shape in side view, being fixed to a rear upper edge part of the tape printer 3, in a freely openable manner so as to cover the upper side of the rolled sheet holder housing section 13. The rolled sheet 12A is wound up on the rolled sheet holder 12 and includes a long thermal sheet (so called, thermal paper) having self color development characteristics, a non-fixed length rolled sheet 12A obtained by adhering a release sheet to one side of the thermal sheet through an adhesive agent, or a die cut and the like obtained by half-cutting the thermal sheet of this non-fixed length rolled sheet 12A in a predetermined shape with a fixed pitch.

A sheet discharging port 15A through which the printed rolled sheet 12A is discharged outside is formed on the front cover 15 at a front side of the top cover 14. A power button 16A, a cut button 16B and a feed button 16C are arranged substantially in a horizontal manner on a front surface at an upper side of the sheet discharging port 15A. Upon being depressed, the cut button 16B drives a cutter unit 17 (refer to FIG. 3) provided inside the sheet discharging port 15A to cut the rolled sheet 12A. Upon being depressed, the feed button 16C discharges the rolled sheet 12A by a fixed amount in the conveying direction.

Figure 3:
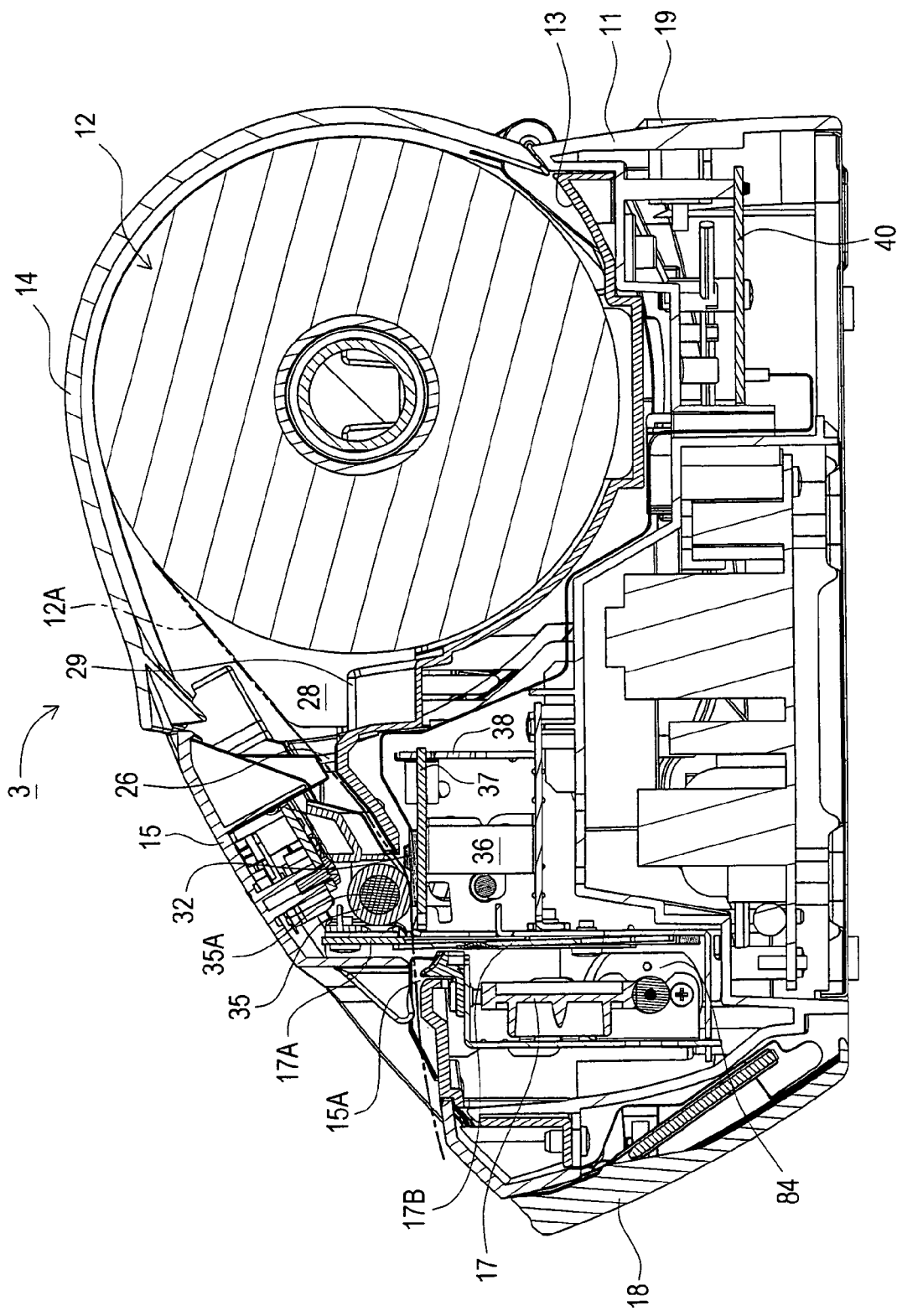
FIG. 3 is a sectional side view showing the state wherein the rolled sheet holder is mounted in the tape printer.

Here, as shown in FIG. 3, the cutter unit 17 is composed of a fixed blade 17A and a movable blade 17B. The movable blade 17B is operated to move in a vertical direction by a cutting motor 84 including a DC motor or the like. The printed rolled sheet 12A is conveyed so that a cutting position at a rear side in a conveying direction reaches a position facing the fixed blade 17A. At this point, the cutting motor 84 causes the movable blade 17B to move in a vertical direction, cutting the printed rolled sheet 12A. Also, the rolled sheet 12A that was cut by the fixed blade 17A and the movable blade 17B is discharged from the sheet discharging port 15A. The movable blade 17B is formed in a V-shape, in front view.

As shown in FIG. 2 and FIG. 3, a tray member 18 is fixed to a lower edge part of the front cover 15 in a freely openable manner so as to cover the front side of the front cover 15. The tray member 18 can be opened by placing a finger in a recess portion 18A formed at an upper end part and pushing towards the front side.

As shown in FIG. 5, an inlet 19 to which a power cord not shown is connected is provided at a rear part of the body case 11, and at the same time, a USB (Universal Serial Bus) connector 20 to which a signal cable K1 is connected is provided at a side part (in FIG. 5, the left side) thereof.

Figure 4:
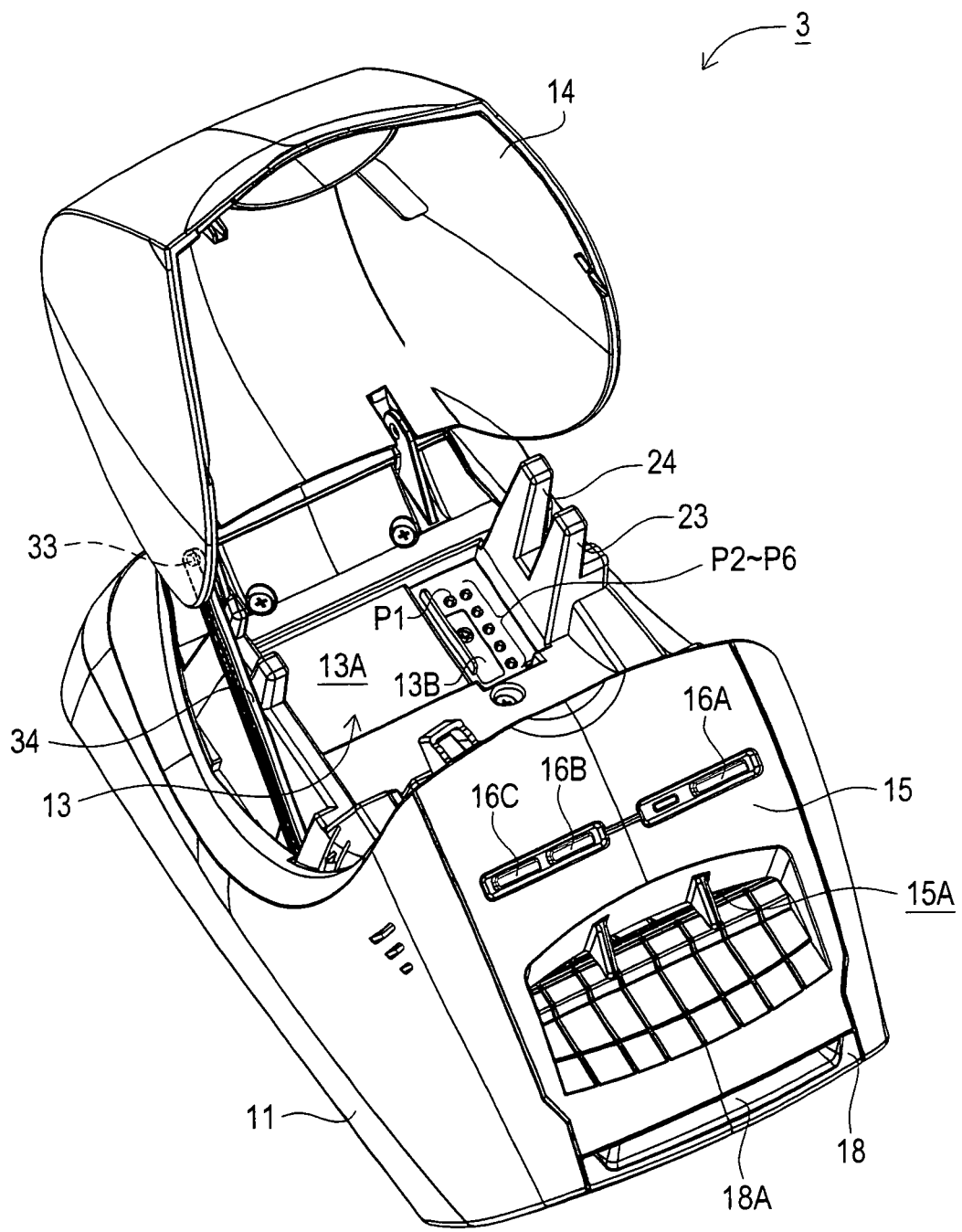
FIG. 4 is a perspective view taken from an upper left front side of the tape printer, with the top cover thereof open.

As shown in FIG. 2, FIG. 4 and FIG. 5, the tape printer 3 has a holder support member 23 provided at one side edge part (in FIG. 2, the right-side edge part) of the rolled sheet holder housing section 13, in a substantially perpendicular direction with respect to a conveying direction. The holder support member 23 can fit a fixing member 22 which has a substantially rectangular shape in cross section and is projected in an outer direction of a holding member 21 constituting a rolled sheet holder 12. This holder support member 23 has a first positioning groove part 24 formed therein, the groove being U-shaped in a substantially longitudinal direction in front view. The groove opens upward in a width direction and at the same time, at both sides in a width direction.

A loading portion 29 is also provided which extends in a substantially horizontal direction between a rear edge part of an insertion opening 26 (refer to FIG. 3) into which the rolled sheet 12A is inserted, and a front upper edge part of the rolled sheet holder housing section 13. Five second positioning groove parts 30A through 30E having a substantially L-shape in cross section are formed at a rear edge corner of the loading part 29 in a conveying direction, at each position corresponding to a plurality of width dimensions of the rolled sheet 12A. The respective second positioning groove parts 30A through 30E are formed so as to enable fitting, from upwards, of a tip lower end part of a guide member 28 that constitutes the rolled sheet holder 12, which tip lower end part comes in contact with the loading part 29, as shown in FIG. 3.

A positioning recess part 13A is formed in a bottom part of the rolled sheet holder housing section 13. The positioning recess part 13A is rectangular in plan view and long sideways in a substantially perpendicular direction with respect to a conveying direction, and extends between an inner base end part and an opposite side base end part of the holder supporting member 23. The positioning recess part 13A has a predetermined depth (in the present embodiment, approximately 1.5 through 3 mm). The positioning recess part 13A is formed so that the width dimension in a conveying direction is substantially equal to the width dimensions of the respective lower edge parts of the holding member 21 and guide member 28 constituting the rolled sheet holder 12.

A discrimination recess part 13B is formed at the inner base end part of the holder support member 23 of the positioning recess part 13A. The discrimination recess part 13B is rectangular in plan view and long in a longitudinal direction with respect to a conveying direction. The discrimination recess part 13B is formed so that a portion facing the sheet discrimination part 60 (refer to FIG. 6) extending inward from a lower edge part of the holding member 21 at a substantially right angle therewith is formed to be deeper than the positioning recess part 13A by a predetermined depth (in the present embodiment, approximately 1.5 through 3 mm deep).

The discrimination recess part 13B is provided with six discrimination sensors P1, P2, P3, P4, P5 and P6 arranged in an L-shaped pattern, for distinguishing the type, material, width and the like of the rolled sheet 12A. These sensors are each constructed of a push-type micro-switch, etc.

These sheet discrimination sensors P1 to P6 are each constructed of a well known mechanical switch including a plunger and a micro-switch, etc. Each plunger is placed so that an upper end part thereof protrudes from the bottom part of the discrimination recess part 13B to the vicinity of the bottom part of the positioning recess part 13A. It is detected whether the sheet discrimination part 60, which extends inward from the lower edge part of the holding member 21 at a substantially right angle therewith, has sensor holes 60A to 60F (see FIG. 6), mentioned later, at the positions corresponding to the sheet discrimination sensors P1 to P6 respectively. Based on an ON/OFF signal representing a detection result by the sensors P1 to P6, the type, material, width and the like of the rolled sheet 12A loaded in the rolled sheet holder 12 are detected.

In the present embodiment, the plungers of the sheet discrimination sensors P1 to P6 normally protrude from the bottom surface of the discrimination recess part 13B to the vicinity of the bottom surface of the positioning recess part 13A. At this time, each micro-switch is in an OFF state. In the case where the sheet discrimination part 60 has sensor holes 60A through 60F at the positions corresponding to the sheet discrimination sensors P1 to P6, the plungers of the sensors are not depressed, leaving the corresponding micro-switches in the OFF state, which generates an OFF signal.

On the other hand, in the case where the sheet discrimination part 60 does not have sensor holes 60A through 60F at the positions corresponding to the sheet discrimination sensors P1 to P6, the plungers of the sensors are depressed, bringing the corresponding micro-switches into an ON state, which generates an ON signal. Accordingly, the respective sheet discrimination sensors P1 through P6 output 6-bit signals made up of [0] and [1]. Thus, if the sheet discrimination sensors P1 through P6 are all in an OFF state, specifically, if the rolled sheet holder 12 is not loaded, a 6-bit signal [000000] is output.

An engaging shaft 33 is erected in an inner side of the top cover 14, at the periphery of the opening for the cover, facing the side edge part opposite the holder support member 23 of the holder housing part 4. The engaging shaft 33 has a circular shape in cross section and its height is substantially equal to the thickness of the link lever 34. This engaging shaft 33 is fitted in a through hole formed in one edge part of the link lever 34 for operating the vertical movement of the thermal head 32 (refer to FIG. 3) so as to allow the edge part of this link lever 34 to freely rotate and detach with respect to the engaging shaft 33.

As shown in FIG. 3, a roller shaft 35A of the platen roller 35 is supported, in a freely rotatable manner, at a back side of the insertion opening 26 in a conveying direction of the rolled sheet. The thermal head 32 is fixed on an upper surface of a head support member 37 which is biased upward by a pressure sensitive spring 36. The rear edge part of the head support member 37, with respect to a conveying direction, is supported on a rear side of a frame 38 so as to allow swinging thereof in a vertical direction.

When the top cover 14 is turned backward for opening, the link lever 34 moves backward in cooperation with the movement of the top cover 14, causing the thermal head support member 37 to move downward, and separating the thermal head 32 from the platen roller 35 arranged opposite therefrom. The rolled sheet 12A is then fed from the insertion opening 26, allowing insertion of the rolled sheet 12A between the platen roller 35 and the thermal head 32.

When closing the top cover 14, the link lever 34 is moved forward in cooperation with the movement of the top cover 14, causing the thermal head support member 37 to move upward. The thermal head 32 then forces the rolled sheet 12 against the platen roller 35 by means of the pressure sensitive spring 36, whereby a printable state is obtained.

Further, below the rolled sheet holder housing section 13, there is provided, through a dividing wall 39, a control board 40 on which a control circuit is formed to drivingly control mechanisms such as the thermal head 32, etc. in response to commands from a computer device 2 or the like.

A schematic configuration of the rolled sheet holder 12 will next be described based on FIG. 6.

Figure 6:
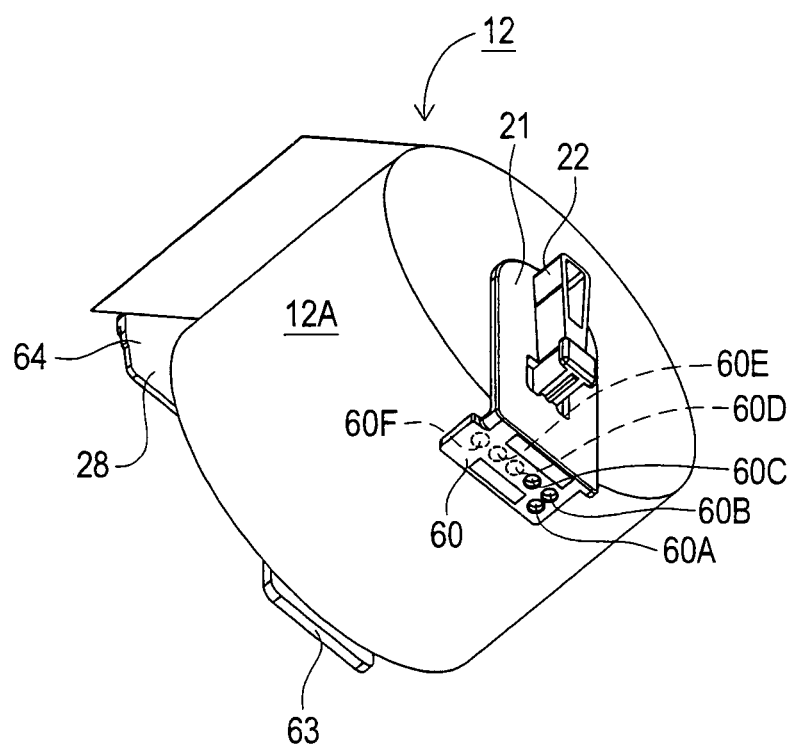
FIG. 6 is a perspective view taken from a lower side and shows one example of a rolled sheet holder having a rolled sheet loaded therein.

As shown in FIG. 6, the rolled sheet holder 12 which has the rolled sheet 12A wound on a sheet core loaded therein in a rotatable manner, has the following configuration.

The guide member 28 constituting the rolled sheet holder 12 is formed with a first extended portion 63 which extends downward and is fitted in the positioning recess part 13A formed in the bottom part of the rolled sheet holder housing section 13 so as to be brought in contact with the bottom surface of the positioning recess part 13A. The guide member 28 is also formed with a second extended portion 64 which has an upper edge part thereof sloped downward to the front side of the loading part 29, so as to cover a substantially front quarter round of the outer end face of the rolled sheet 12A.

The second extended portion 64 has a lower end part which extends substantially horizontally, and a tip lower end part which is inserted in any of the second positioning groove parts 30A to 30E facing the sheet width of the rolled sheet 3A thus loaded. The second extended portion 64 is formed so that one side edge of the rolled sheet 12A thus loaded is guided along the inner surface of the second extended portion 64 up to the insertion opening 26 (refer to FIG. 2).

A holder shaft member 62 erected on an inner surface of the guide member 28 and an inner surface of the holding member 21 serves to rotatably support the sheet core onto which the rolled sheet 12A is wound. The holder shaft member 62 may be selected from amongst a plurality of types of shafts (five shafts including 12 mm, 17 mm, 29 mm, 38 mm and 62 mm in the present embodiment) of different lengths individually corresponding to the lengths of the sheet core for the rolled sheet 12A.

A mounting member 22 of the holding member 21 is formed so as to become narrower in a downward direction in a front view (bottom in FIG. 6) and to be fitted in the first positioning groove part 24 having a narrower width towards the bottom of the holder support member 23 in the tape printer 3. The mounting member 22 is formed so that the protruding height thereof becomes almost equal to the width of the first positioning groove part 24. Accordingly, to mount the rolled sheet holder 12, the mounting member 22 is inserted into the first positioning groove part 24. Thus, the rolled sheet holder 12 can be fitted in place.

The holding member 21 is designed to have its lower edge part of the guide member 28 extending downward longer by a predetermined length (about 1.0 mm to 2.5 mm in this embodiment) than the lower edge part of the guide member 28. The holding member 21 is also provided, at the lower edge part thereof, with a sheet discrimination part 60 of a substantially rectangular shape extending inward by a predetermined length at substantially right angle therewith. As mentioned earlier, the sheet discrimination part 60 is formed with the sensor holes 60A to 60F arranged at predetermined positions corresponding to the sheet discrimination sensors P1 through P6 respectively, in an L-shaped pattern. FIG. 6 shows that the sensor holes 60A through 60C from amongst sensor holes 60A through 60F have been formed in the sheet discrimination part 60.

Here, out of the 6 sensor holes 60A through 60F, maximum 5 sensor holes are formed in the sheet discrimination part 60. Specifically, the presence and absence of the respective sensor holes 60A through 60F are allocated "1" and "0" respectively so that the type, material and width of the rolled sheet 12A held in the rolled sheet holder 12 can be represented by 6-bit codes such as [000001] through [111111]. A 6-bit code such as [000000] shows that the rolled sheet holder 12 is not loaded.

Next, the circuit configuration of the computer device 2 constituting the label printing system 1 will now be described based on FIG. 7.

Figure 7:
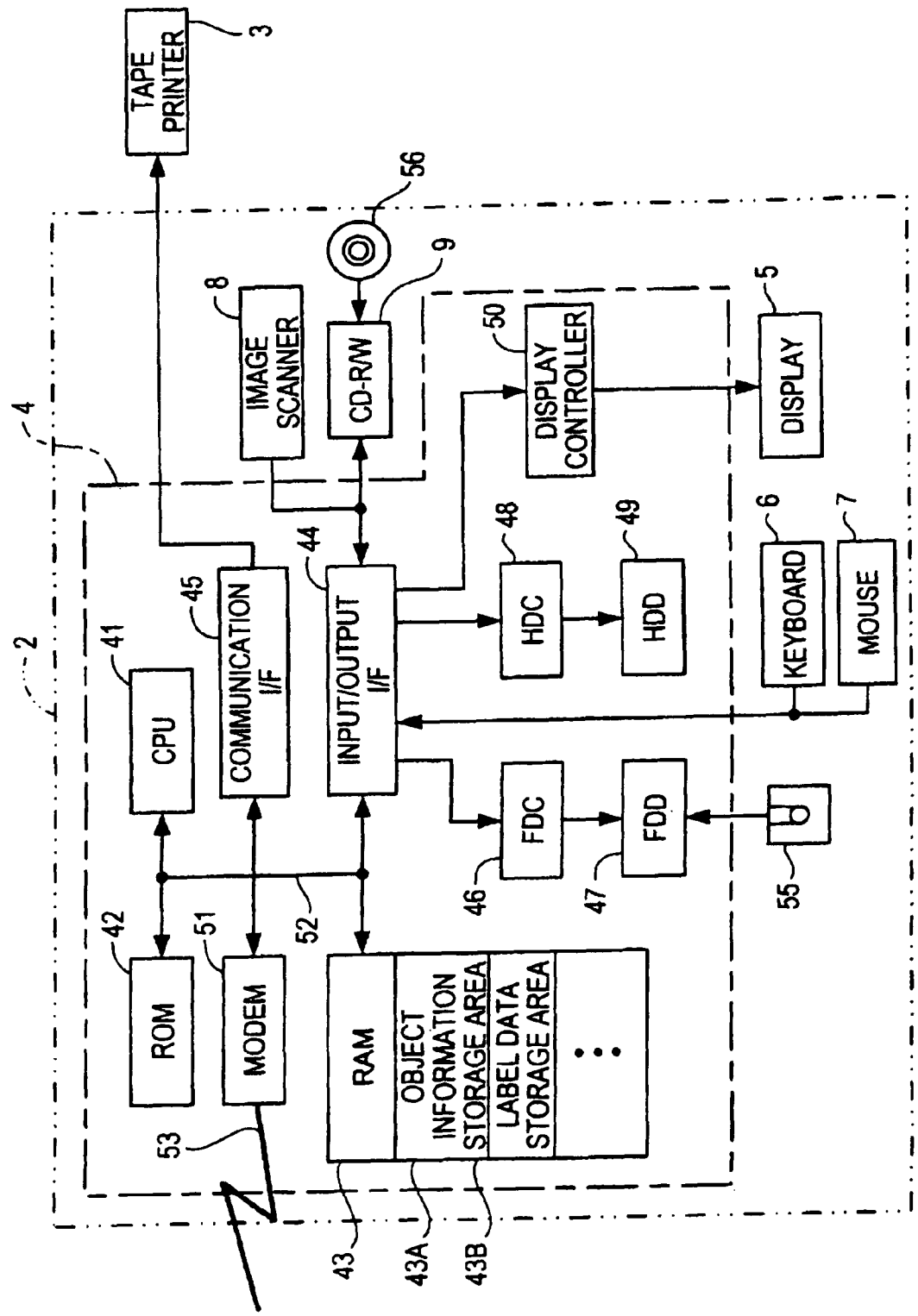
FIG. 7 is a circuit block diagram that shows a circuit configuration of a main section in the computer device as shown in FIG. 1.

As shown in FIG. 7, the host controller 4 of the computer device 2 has a CPU 41, a ROM 42, a RAM 43, an input/output interface (I/F) 44, a communication interface (I/F) 45, a Floppy™ disc controller (FDC) 46, a Floppy™ disc drive (FDD) 47, a hard disc controller (HDC) 48, a hard disc drive (HDD) 49, a display controller 50, a modem 51, and the like. The CPU 41, the ROM 42, the RAM 43, the input/output interface (I/F) 44, the communication interface (I/F) 45, and the modem 51 are interconnected through a bus line 52, whereby exchange of data is performed. To the input/output I/F 44, the FDD 47 and the HDD 49 are connected through the FDC 46 that drivingly controls the FDD 47, and the HDC 48 that drivingly controls the HDD 49, respectively. The display controller 50 is also connected to the input/output I/F 44. A telephone line 53 is connected to a modem 51.

The keyboard 6, the mouse 7, the image scanner 8 and the CD-R/W drive 9 are connected to the host controller 4. The keyboard 6 is used for entering characters and symbols through the input/output I/F 44. The mouse 7 is used for entering the coordinates on the display screen of the display 5. The image scanner 8 is used for capturing visible outline data and the like from drawings. The CD-R/W drive 9 is used for writing into and reading from a CD-ROM 56, print data and capture applications, etc. which are application software as will be described later. Also, the display 5 is connected to the host controller 4 through the display controller 50. The display 5 displays a layout edit window as will be described later, and the layout and the like of a non-fixed length rolled sheet 12A. Further, the tape printer 3 is connected to the host controller 4, through the communication I/F 45 and the signal cable K1.

The CPU 41 controls the entire label printing system 1, and manages all data concerning the operation of the label printing system 1. The ROM 42 stores a startup program for booting the computer device 2 at power-on to start up the CPU 41, which is in common with general personal computers.

The RAM 43 temporarily stores different types of data when the CPU 41 performs various kinds of control. The RAM 43 has an object information storage area 43A and a label data storage area 43B. The object information storage area 43A stores object information such as image data or the like. The label data storage area 43B stores template data transmitted to the tape printer 3 and label data including character string data, drawing pattern data and the like entered through the keyboard 6.

The communication I/F 45 is composed of, for instance, a Centronics interface and USB (Universal Serial Bus), which allows interactive data communications with the tape printer 3 and an external electronic device (such as a computer or a laser printer)

The hard disc mounted in the HDD 49 stores an operating system (OS) of various kinds such as MS-DOS™ and Windows™. In addition, the hard disc also stores communication protocols for data communications with the tape printer 3 and the external electronic device, application software of various kinds, such as word processing software executable in the browser and the OS and a layout editing software for creating the label data for printing, as required. The hard disc can also store control programs such as a capture application. According to this capture application, window capturing can be carried out as will be described later, and a snap mode can be set wherein an object such as image data and the like is edited by inserting the object into a print area of the tape onto which the label data is displayed. Also, according to this capture application, it possible to create print labels including text only in a state that this snap mode is set, through a capture window 95 (refer to FIG. 17) which is one example of a displayed window.

This capture application is a relatively small and lightweight application software. This means that when present, this software consumes a small amount of system resources, contributing to a stable operation.

A Floppy™ disc (FD) 55 which is mounted so as to be easily detachable from the FDD 47 stores a variety of print data.

An optical disc (CD-ROM) 56 which is mounted so as to be easily detachable from the CD-R/W drive 9 stores control programs for a control process with respect to a capture application or a layout editing process. According to the capture application, window capturing can be carried out as will be described later, and an object such as image data or the like is edited by inserting the object in a print area of a tape wherein label data is displayed. According to the layout editing process, an object is edited by inserting and displaying the object in a print area of a tape wherein label data is displayed when the capture application is activated. The optical disc 56 stores object information concerning the various objects of various formats, such as GIF, JPEG, BMP or the like (for instance, object name, length dimension of the original image for the object, width dimension of the original image for the object, image data and the like). This information is then supplied to the respective label creating apparatuses.

Next, the circuit configuration of the tape printer 3 constituting the label printing system 1 will be described based on FIG. 8 through FIG. 10.

Figure 8:
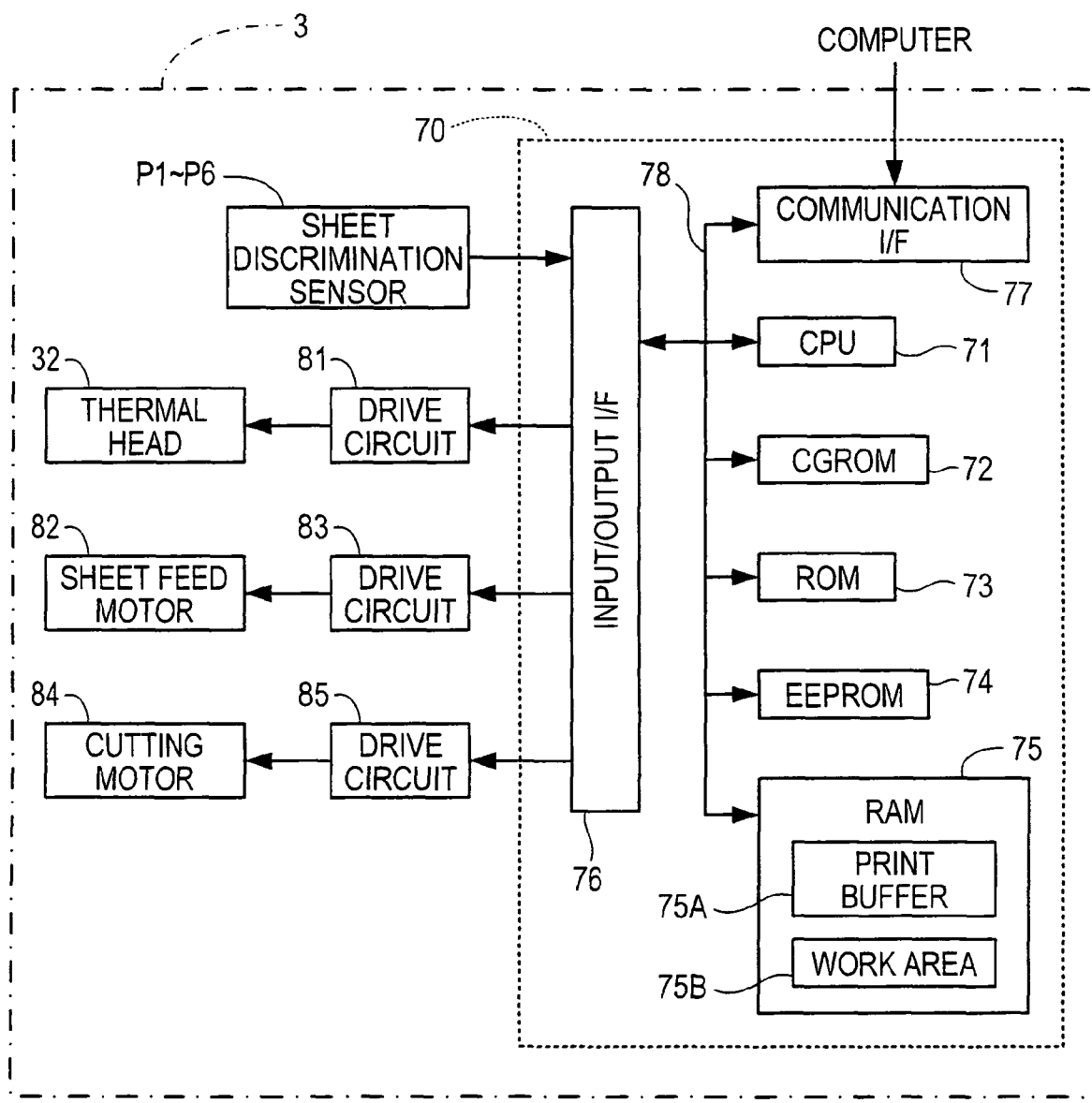
FIG. 8 is a circuit block diagram that shows a circuit configuration of a main section in the tape printer as shown in FIG. 1.

As shown in FIG. 8, a control circuit 70 formed on the control board 40 of the tape printer 3 has a CPU 71, a CG (character generator) ROM 72, a ROM 73, a flash memory (EEPROM) 74, a RAM 75, an input/output interface ("I/F") 76, a communication interface (I/F) 77 and the like. The CPU 71, CGROM 72, ROM 73, flash memory 74, RAM 75, input/output interface ("I/F") 76 and the communication interface (I/F) 77 are interconnected through a bus line 78, whereby exchange of data is performed.

The CGROM 72 stores dot pattern data corresponding to individual characters. The dot pattern data is read out from the CGROM 72 and a dot pattern is printed on the thermal sheet of the rolled sheet 12A based on that dot pattern data.

The ROM 73 stores various types of programs, such as a label creating process program of the non-fixed length rolled sheet 12A, required to control the tape printer 3. The ROM 73 stores a sheet type table 731 (refer to FIG. 9) including the types of rolled sheet 12A with respect to the respective 6-bit codes inputted from the sheet discrimination sensors P1 through P6, and the material, etc. of the thermal sheet of the rolled sheet 12A corresponding to the respective 6-bit codes that were inputted from the sheet discrimination sensors P1 through P6. The ROM 73 stores a die cut type table 732 (refer to FIG. 10) including the dimensions of the die cut label for each die cut.

Here, one example of the sheet type table 731 which stores the various types of rolled sheet 12A corresponding to the individual 6-bit codes inputted from the sheet discrimination sensors P1 through P6 will now be described based on FIG. 9.

As shown in FIG. 9, the sheet type table 731 is composed of a [sheet discrimination sensor] column showing the 6-bit codes inputted from the respective sheet discrimination sensors P1 through P6, and a [rolled sheet type] column showing the type of the rolled sheet 12A corresponding to the respective 6-bit codes.

For instance, item [12 mm non-fixed length] in the [rolled sheet type] column corresponds to the case that the [sheet discrimination sensor] is [110100], and shows a rolled sheet 12A having 12 mm width and non-fixed length. Also, item [12 mm die cut 1] in the [rolled sheet type] column corresponds to the case that the [sheet discrimination sensor] is [111001] and shows a die cut wherein the thermal sheet of a 12 mm-wide non-fixed length rolled sheet 12A is half cut by a fixed pitch in a predetermined shape.

Here, one example of the die cut type table 732 wherein the dimensions of the die cut label for each individual cut are stored, will now be described based on FIG. 10.

As shown in FIG. 10, the die cut type table 732 is composed of a [die cut type] column that shows the type of the die cut and a [width×length] column showing the dimensions of the die cut labels that were half-cut. For instance, item [12 mm×54 mm] in the [width×length] column corresponds to the case that the [die cut type] is [12 mm die cut 1]. Specifically, the [12 mm die cut 1] shows that the thermal sheet of the 12 mm-wide non-fixed length rolled sheet 12A is half-cut in advance by a fixed pitch into die cut labels of [12 mm×54 mm].

The CPU 71 serves to execute various operations in accordance with the various programs stored in the ROM 73. The ROM 73 stores outline data related to individual large numbers of characters for defining outlines of the characters. The characters of the outline data are classified in units of a typeface (Gothic typeface, Mincho typeface, or the like), in correlation to code data. The dot pattern data is extracted to a print buffer 75A in accordance with the outline data.

The flash memory 74 serves to store dot pattern data such as extended character data received from an external computer device 2, etc. and dot pattern data such as various types of drawing pattern data, which have been allocated registration numbers. The flash memory 74 retains the stored contents even when the power of the tape printer 3 is OFF.

The RAM 75 temporarily stores results of various operations performed by the CPU 71. In the RAM 75 are provided various types of memories such as a print buffer 75A and a work area 75B or the like. The print buffer 75A stores print dot patterns such as a plurality of characters and symbols and number of applied pulses representing the energy amount for creating the dots, as dot pattern data. The thermal head 32 carries out dot printing in accordance with dot pattern data stored in the print buffer 75A.

The input/output I/F 76 is connected to the sheet discrimination sensors P1 through P6, a drive circuit 81, a drive circuit 83 and a drive circuit 85, etc., respectively. The drive circuit 81 is used for driving the thermal head 32. The drive circuit 83 is used for driving the sheet feed motor 82 which causes the platen roller to rotate. The drive circuit 85 is used for driving the cutting motor 84 that operates the vertical movement of the movable blade 17B.

The communication I/F 77 is connected to the USB connector 20, and to an external computer device 2 through a signal cable K1, allowing interactive data communications therewith. Accordingly, in case of a request for transmission of information with respect to the rolled sheet 12A loaded in the tape printer 3, from the CPU 41 of the computer device 2, the CPU 71 reads out information with respect to the rolled sheet 12A loaded in the tape printer 3 from the sheet type table 731 or the die cut type table 732, based on the output signal from the respective sheet discrimination sensors P1 through P6. The CPU 71 then transmits this information to the computer device 2. The CPU 71 creates the label sheet based on the print instruction command and print data that were transmitted from the CPU 41 of the computer device 2.

Next, a layout editing process for editing an object such as image data by inserting the object in a print area of the rolled sheet, which is carried out by the CPU 41 of the computer device 2 in the tape printing system 1 having the above-described configuration will be described based on FIG. 11 through FIG. 23.

Figure 11:
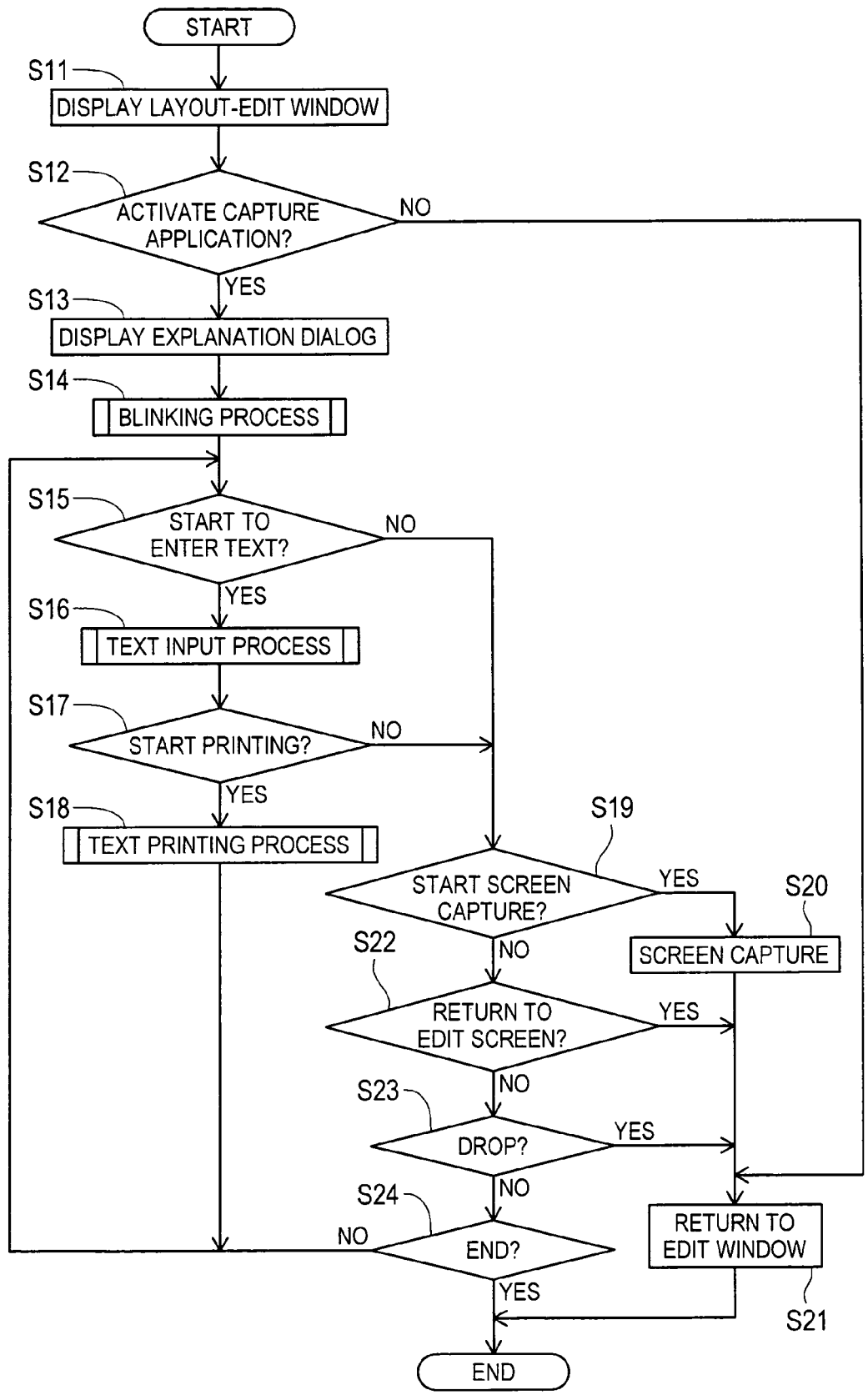
FIG. 11 is a main flow chart showing a layout editing process of editing an object such as image data and the like by inserting this object in a print area of a rolled sheet, the process being carried out by the CPU of the computer device shown in FIG. 1.

As shown in FIG. 11, at step (hereinafter referred to as S) 11, upon activation of a layout editing software for creating label data to be printed on the non-fixed length rolled sheet 12A, etc., the CPU 41 of the computer device 2 first displays a layout edit window on the display screen of the display 5 and then displays a layout showing a print area of the non-fixed length rolled sheet 12A as loaded in the tape printer 3. Before displaying the layout edit window, the CPU 41 acquires, from the CPU 71 of the tape printer 3, the type (whether it is non-fixed length rolled sheet, die cut, or the like) and the sheet width of the rolled sheet 12A which is loaded in the tape printer 3, through the communication interface 45.

Figure 15:
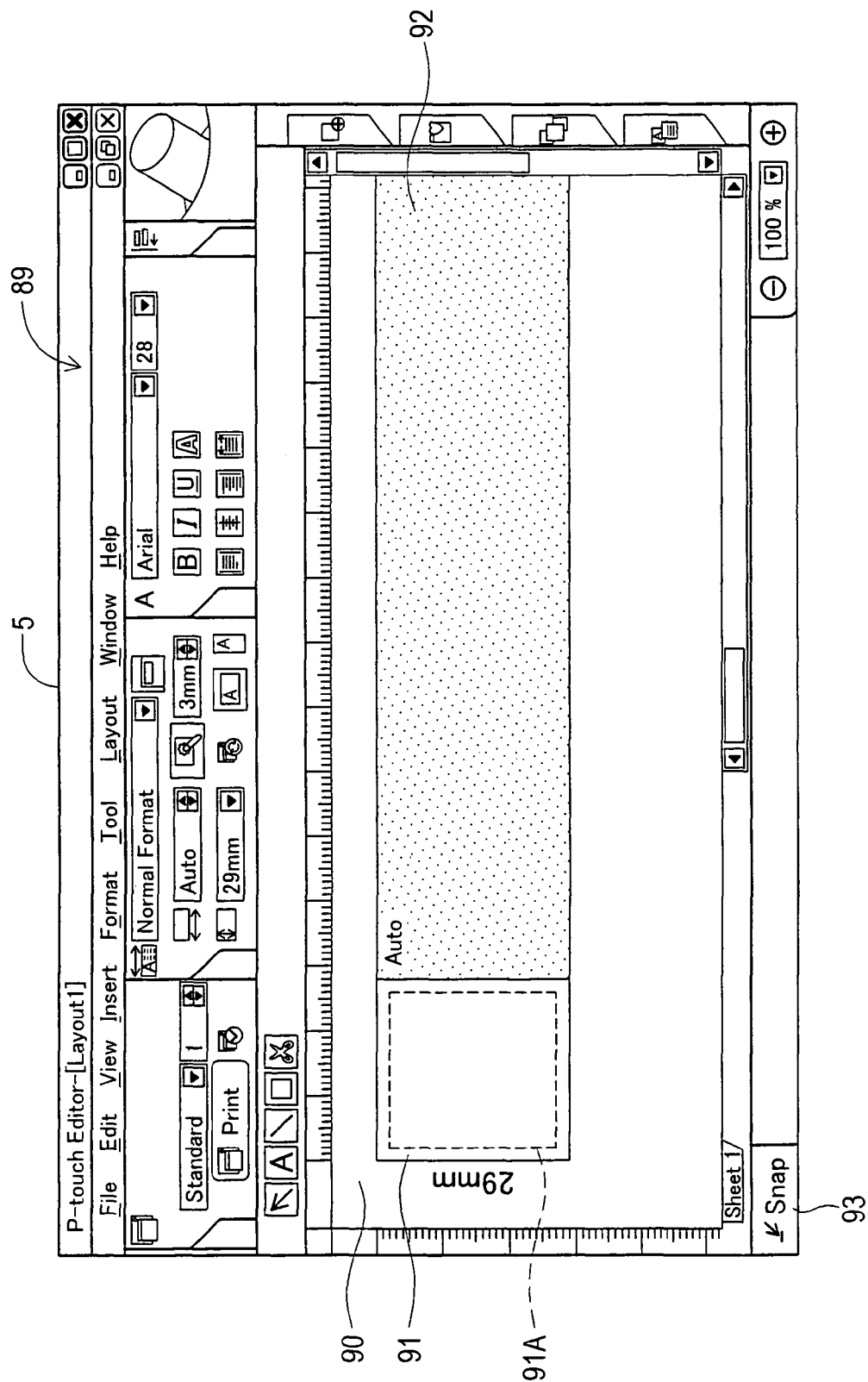
FIG. 15 is a view showing one example of a layout edit window.

More specifically, as shown in FIG. 15, the CPU 41 displays, on the display 5, a layout edit window 89, including a layout display window 90. In a case where a 29 mm-wide non-fixed length rolled sheet 12A is loaded in the tape printer 3, the CPU 41 displays a square-shaped layout 91 indicating a non-fixed length rolled sheet 12A, on the layout display window 90. The layout 91 has a square-shaped print area 91A provided therein and shown by a broken line.

When the text to be printed is horizontal writing and a non-fixed length rolled sheet 12A is loaded, the CPU 41 causes the following display. Specifically, the CPU 41 displays an outline 92 which is rectangular and long sideways, with the outline extending from a right side of the layout 91 up to the side edge portion of the layout display window 90. Also, the word [Auto] which shows that the free length print mode is set is shown in the outline 92 at a side edge portion with the layout 91. As soon as the layout editing software is activated, the text to be printed is set to horizontal writing and, if the non-fixed length rolled sheet 12A is loaded, print mode is set to the free length print mode at the same time.

The CPU 41 indicates the conveying direction by displaying item [29 mm] showing the width of the sheet, at an outer side of the left side edge portion of the layout 91, in parallel with the left side edge portion. Then, when the user designates the coordinate position inside this print area 91A with the mouse 7, and enters the respective characters and the graphic symbols, of which size has been specified, as label data through the keyboard 6 and the like, the CPU 41 arranges and displays the respective characters and graphic symbols at the designated position, at a predetermined size. The CPU 41 stores the respective label data in the RAM 43 as text data or image data corresponding to the print area 91A.

Next, at S12, the CPU 41 carries out a judgment process to judge whether or not the capture application activate button 93 (refer to FIG. 15) which is displayed at the lower left corner of the layout edit window 89 has been clicked with the mouse 7. More specifically, the CPU 41 judges whether or not a command to activate the capture application has been issued.

If the capture application activate command has not been issued (S12: NO), the CPU 41 shifts the flow to process S21. At S21, the CPU 41 displays the layout edit window 89 (refer to FIG. 15) for layout editing. Thereafter, the CPU 41 ends this process.

Alternatively, if a capture application activate command is issued (S12: YES), the CPU 41 shifts the flow to process S13. At S13, the CPU 41 displays an explanation dialog box 94 (refer to FIG. 16) on the display 5 for describing various functions such as a screen capture function, a drag-and-drop function, a text print function and the like which can be executed through the capture button 96 (refer to FIG. 17) indicating that the capture application is in an activated state, in other words, the state wherein the snap mode is set.

Here, one example of the explanation dialog box 94 will be described based on FIG. 16.

Figure 16:
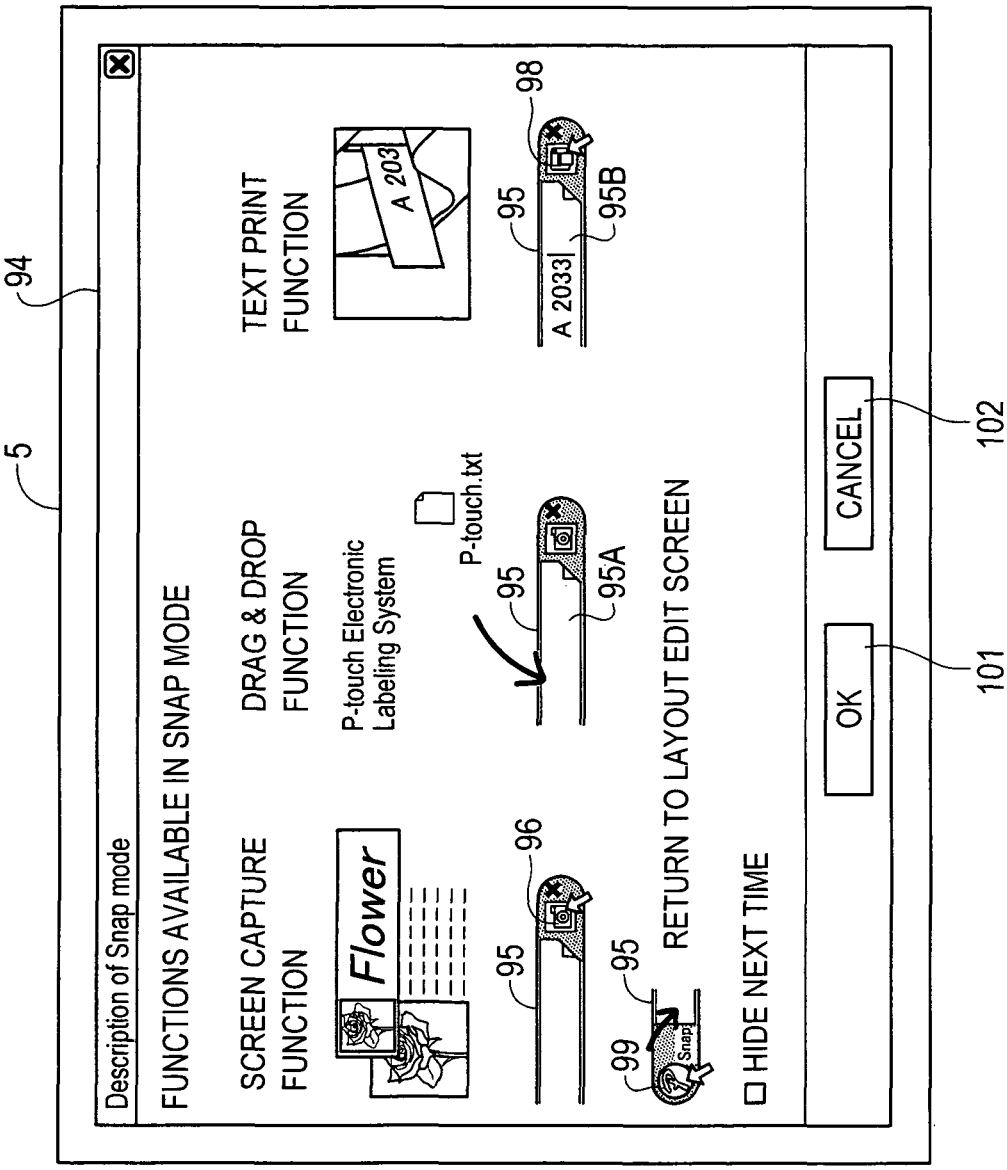
FIG. 16 is a view showing one example of an explanation dialog box for explaining the functions of a capture application.

As shown in FIG. 16, the explanation dialog box 94 displays a screen capture function, a drag-and-drop function and a text print function as functions which can be used while the capture application is in activated state, more specifically, while the snap mode is set. At a left side portion of the explanation dialog box 94 is displayed a message showing that the screen capture function for capturing a rectangular area selected from amongst the data displayed on the display 5 with a click of the mouse 7, as bit-map image data, can be used by a click with the mouse 7 of the capture button 96 in the capture window 95, serving as one example of a window.

At a central portion of the explanation dialog box 94 is displayed a message showing that the drag-and-drop function of inserting an object inside a print area 91A of the layout 91 during editing can be used by dragging and dropping an object in a drop area 95A of the capture window 95. At a right side portion of the explanation dialog box 94 is displayed a message showing that the text print function for printing the text that was entered onto the rolled sheet 12A can be used by entering the text in the edit area 95B of the capture window 95 and clicking the print button 98 with the mouse 7.

At a left lower side portion of the explanation dialog box 94 is displayed a message showing that the capture application has ended and the flow will return to layout edit window 89 by clicking the edit return button 99 of the capture window 95 with the mouse 7.

At a lower edge portion of the explanation dialog box 94 are displayed an OK button 101 and a cancel button 102. The OK button 101 is used for entering a command to activate the capture application, and the cancel button 102 is used for entering a command to cancel activation of the capture application.

Next, at S13, if the OK button 101 of the explanation dialog box 94 is clicked with the mouse 7, the CPU 41 shifts the flow to process S14. At S13, if the cancel button 102 of the explanation dialog box 94 is clicked with the mouse 7, the CPU 41 shifts the process to S21.

At S14, the CPU 41 executes the sub-processes of the [blinking process], and then shifts the flow to process S15.

Here, the sub-processes of the [blinking process] will be described based on FIG. 12, FIG. 17 and FIG. 18.

Figure 12:
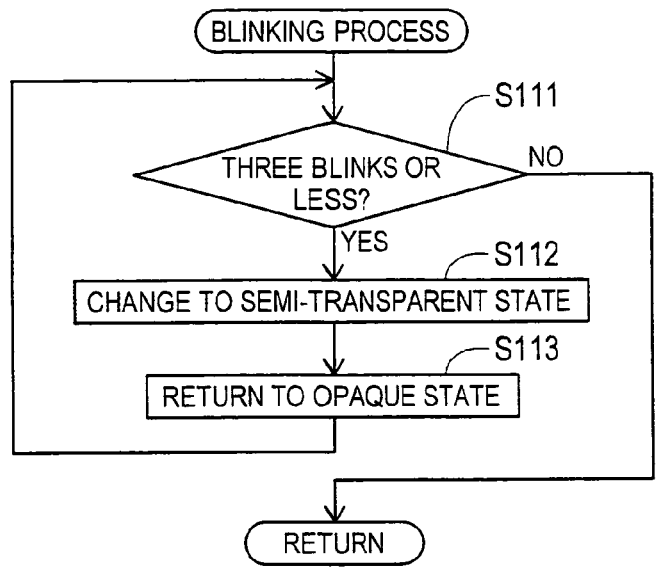
FIG. 12 is a sub-flow chart showing sub-processes of a [blinking process] as shown in FIG. 11.

As shown in FIG. 12, at S111, the CPU 41 causes blinking by deleting the layout edit window 89 and displaying the capture window 95 at any of the side edge portions of the display screen of the display 5. The CPU 41 then carries out a judgment process to judge whether or not the number of blinks for the displayed capture window 95 is equal to or less than 3 times. More specifically, the CPU 41 carries out a judgment process of reading out the value of the blink counter from the RAM 43 and judging whether or not the value of the blink counter is [3]. Upon activation of the capture application, value [0] is assigned to the blink counter and the result is stored in the RAM 43.

Figure 17:
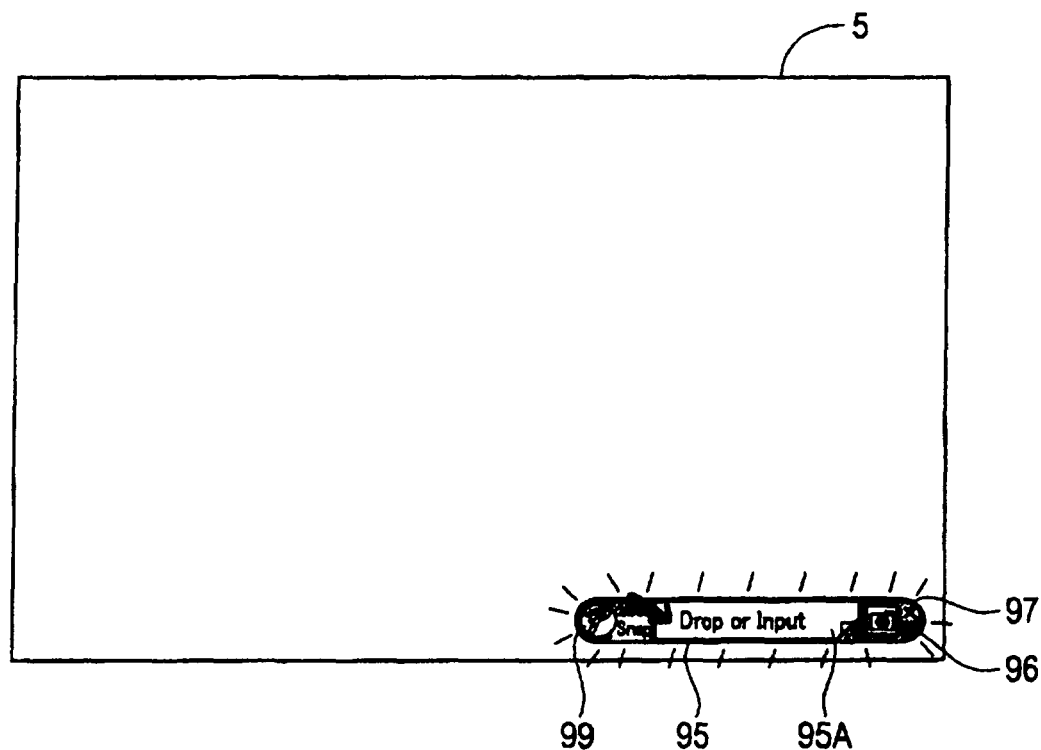
FIG. 17 is a view showing one example of a display screen when a capture application is activated.

For instance, as shown in FIG. 17, upon activation of the capture application, the CPU 41 causes blinking to occur by a predetermined number of times (in the present embodiment, 3 times) by deleting the layout edit window 89 and displaying the capture window 95 at a right lower corner of the display screen in the liquid display 5. This capture window 95 is formed as small as possible to allow constant display thereof in front of the browser and the rest of the display area. In normal operation, the capture window 95 has a drop area 95A displayed at a central part thereof for dragging and dropping an object. This drop area 95A contains the message [Drop or Input]. At the right side of this drop area 95A is displayed the capture button 96. At a right upper side of the capture button 96 is displayed a completion button 97 which is used to enter a command for deleting the capture window 95 from the screen. Further, at a left side of the drop area 95A is displayed an edit return button 99.

If the number of blinks of the capture window 95 is equal to or less than 3 times (S111: YES), the CPU 41 shifts the flow to process S112. At S112, the CPU 41 subjects the capture window 95 and the background image to alpha blending. Specifically, the CPU 41 changes the alpha value of the respective pixels for the capture window 95 and the background image, causing the capture window 95 to change from an opaque state as shown at the upper side in FIG. 18 to a semi-transparent state as shown at a lower side in FIG. 18.

Figure 18:
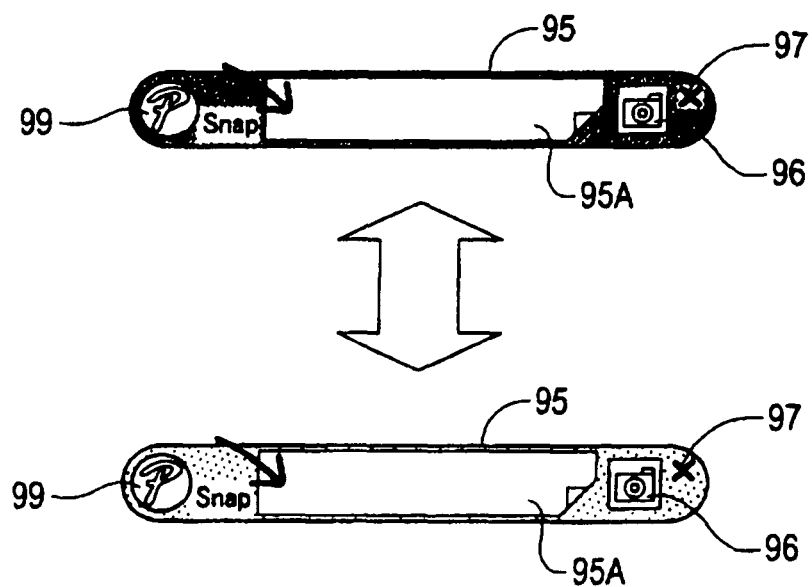
FIG. 18 is a view for describing a blinking capture window.

Next, at S113, the CPU 41 subjects once again the capture window 95 and the background image to alpha blending and, as shown in FIG. 18, returns the capture window 95 from the semi-transparent state as shown at the lower side in FIG. 18 to the original opaque state as shown at an upper side in FIG. 18. Thereafter, the CPU 41 adds [1] to the blink counter and shifts the flow to process S111. As a result, the capture window 95 is caused to blink one time.

Alternatively, at S111, if the number of blinks for the capture window 95 is above [3], specifically, if the value of the blink counter as read out from the RAM 43 is [3] (S111: NO), the CPU 41 judges that the capture window 95 has blinked three times and ends the sub-processes. After this, the CPU 41 shifts the flow to process S15 of the main flow chart.

At S14, the capture window 95 may be caused to blink by creating in advance a capture window 95 in a semi-transparent state and then causing the capture window 95 which is in an opaque state and the capture window 95 which is in a semi-transparent state and which are displayed on the display screen to be alternately displayed by a predetermined number of times (for instance, 3 times). At S14, the capture window 95 may also be caused to blink by creating in advance a capture window 95 of a different color and then causing the capture window 95 which is displayed on the display screen and the capture window 95 of a different color to be alternately displayed by a predetermined number of times (for instance, 3 times).

At S14, letter [P] of the edit return button 95 in the capture window 95 may also be caused to blink by a predetermined number of times (for instance, 3 times). At S14, the number of blinks for the capture window 95 is not limited to 3 times, and may be set to a predetermined number (in the range between 2 blinks and 10 blinks). The capture window 95 may be caused to blink 3 to 5 times not only upon activation of the capture application, but also at predetermined intervals (for instance, every 15 minutes or 30 minutes).

Next, as shown in FIG. 11, at S15, the CPU 41 executes a judgment process to judge whether or not the user has started to enter text by using the text print function. Specifically, the CPU 41 executes a judgment process to judge whether text has been entered from the keyboard 6 by clicking the drop area 95A of the capture window 95 with the mouse 7. If text has been entered from the keyboard 6 by clicking the drop area 95A of the capture window 95 with the mouse 7 (S15: YES), the CPU 41 shifts the flow to process S16.

At S16, the CPU 41 executes the sub-processes of the [text input process] and then shifts the flow to process S17.

Here, the sub-processes of the [text input process] will be described based on FIG. 13 and FIG. 19.

Figure 13:
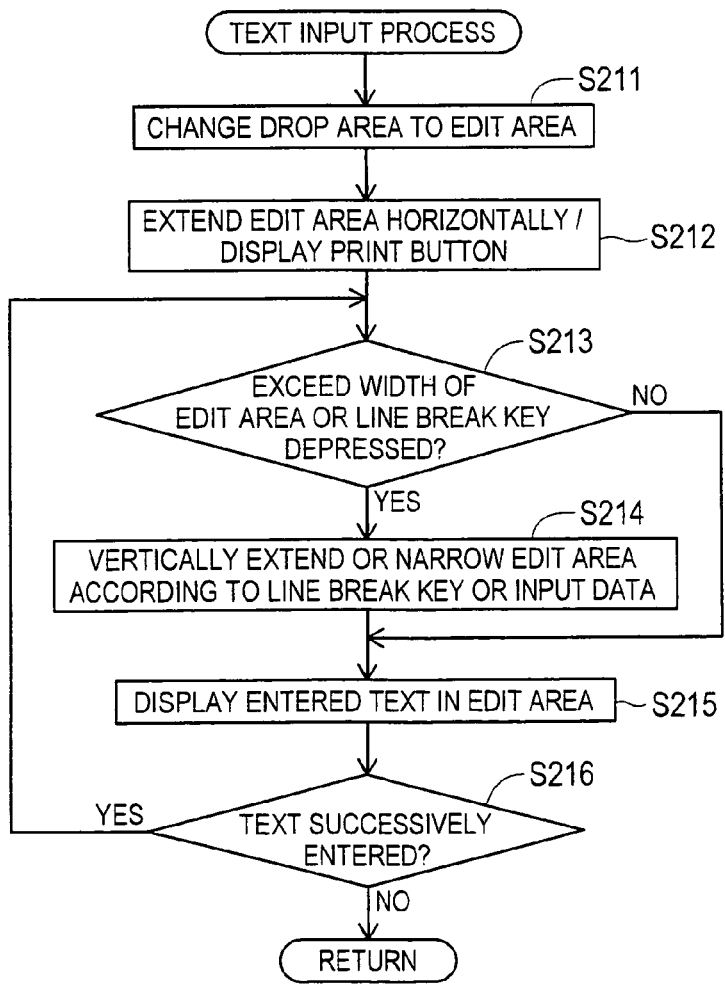
FIG. 13 is a sub-flow chart showing sub-processes of the [text input process] as shown in FIG. 11.

As shown in FIG. 13, at S211, the CPU 41 changes the drop area 95A of the capture window 95 to the edit area 95B which displays text characters that were entered from the keyboard 6.

At S212, the CPU 41 extends the capture window 95 in a latitudinal direction and then extends the edit area 95B in a latitudinal direction. As a result, text that was entered inside the edit area 95B from the keyboard 6 can be displayed sequentially. At the same time, the capture button 96 which is used for entering a command to activate the screen capture function is changed to the print button 98 which is used for entering a command to print text which is displayed on the edit area 95B.

Figure 19:
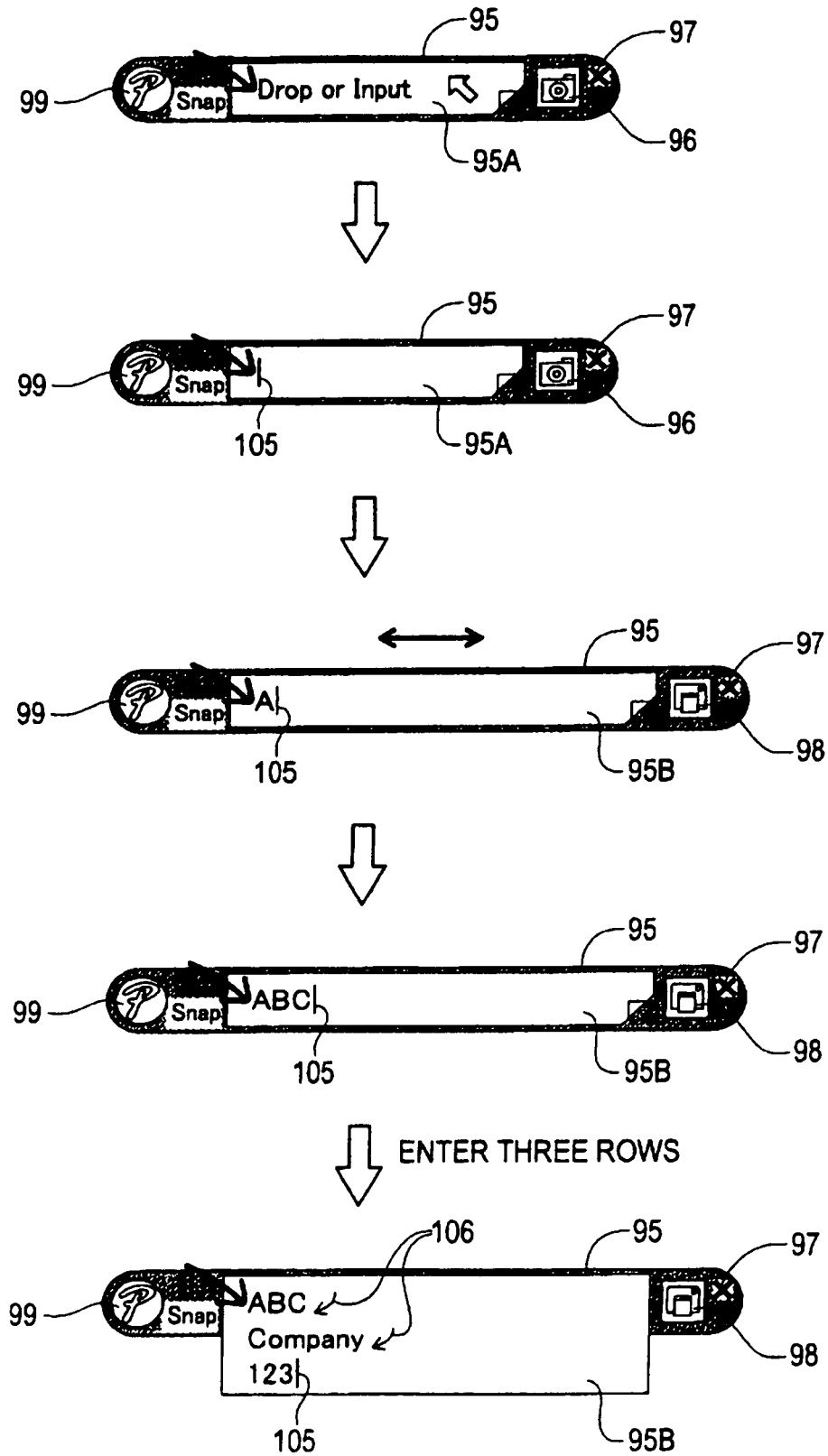
FIG. 19 is a view showing one example of inputting text to the capture window.

As is shown at the top first image in FIG. 19, if the drop area 95A of the capture window 95 is clicked with the mouse 7, the CPU 41 displays the cursor 105 in a blinking fashion on the drop area 95A, as shown in the second image from the top in FIG. 19.

If the user enters text in the form of one character from the keyboard 6, the CPU 41 changes the drop area 95A of the capture window 95 to the edit area 95B onto which text entered from the keyboard 6 is displayed, as shown in the third image from the top in FIG. 19. The capture window 95 extends in a latitudinal direction and the edit area 95B extends in a latitudinal direction. Also, a print button 98 for entering a command to print text is displayed at a right side of the edit area 95B, in place of the capture button 96 which is used for entering a command to activate the screen capture function which is displayed at the right side in the drop area 95A.

Next, as shown in FIG. 13, at S213, the CPU 41 executes a judgment process for judging whether or not the text which was entered to the edit area 95B has exceeded the width of the edit area 95B, or whether the line break key of the keyboard 6 has been depressed. If the text which was entered to the edit area 95B exceeds the width of the edit area 95B, or the line break key of the keyboard 6 has been depressed (S213), the CPU 41 shifts the flow to process S214. At S214, the CPU 41 extends the edit area 95B in a longitudinal direction by one row each time the text which was entered to the edit area 95B exceeds the width of the edit area 95B or alternatively, each time the line break key on the keyboard 6 is depressed. The CPU 41 then causes the cursor 105 to blink at the head of the next row and shifts the flow to process S215.

If the back space key is depressed after the text that was entered into the edit area 95B has exceeded the width of the edit area 95B by one letter or alternatively, after the line break key on the keyboard 6 has been depressed, the cursor 105 is displayed again at the back end of the upper row in a blinking fashion and the edit area 95B is shrunk in a longitudinal direction by one row.

Alternatively, if the text which was entered to the edit area 95B does not exceed the width of the edit area 95B and the line break key of the keyboard 6 has not been depressed (S213: NO), the CPU 41 shifts the flow to process S215. At S215, the CPU 41 displays the text that was entered from the keyboard 6 sequentially in a latitudinal direction of the edit area 95B.

If the character key [A] of the keyboard 6 is depressed, the CPU 41 displays text [A] in the edit area 95B which is displayed so as to extend in a latitudinal direction, as shown in the third image from the top in FIG. 19. If the character keys [B] and [C] of the keyboard 6 are depressed next, the CPU 41 displays text [ABC] on the edit area 95B and displays the cursor 105 at the back end of the edit area 95B in a blinking fashion, as shown in the fourth image from the top in FIG. 19.

For instance, the fifth image from the top in FIG. 19 shows the case that the [ABC] character keys on the keyboard 6 have been depressed and the line break key has been depressed, after which the character keys [Company] on the keyboard 6 have been depressed and the line break key has been depressed, and further, the character keys on the keyboard 6 have been depressed. As shown in the fifth image from the top in FIG. 19, the CPU 41 extends the edit area 95B by one row in a longitudinal direction each time the line break key is depressed. Here, 3 rows of text including [ABC], [Company] and [123] are displayed sequentially on the edit area 95B in a longitudinal direction. A line break mark 106 is displayed at the back end of texts [ABC] and [Company] and the cursor 105 is displayed at the back end of text [123] in a blinking fashion. It should be noted that the line break mark 106 does not necessarily have to be displayed at the back end of texts [ABC] and [Company].

As shown in FIG. 13, at S216, the CPU 41 executes a judgment process of judging whether or not text is successively entered, specifically, whether the print button 98 has been clicked with the mouse 7 or alternatively, whether the area outside the edit area 95B has been clicked with the mouse 7. If text is successively entered, specifically, if the print button 98 has not been clicked with the mouse 7 and the area outside the edit area 95B has not been clicked with the mouse 7 (S216: YES), the CPU 41 executes the processes following S213 once again.

If text is not entered successively, specifically, if the print button 98 has been clicked with the mouse 7 or alternatively, the area outside the edit area 95B has been clicked with the mouse 7 (S216: NO), the CPU 41 stores the text displayed on the edit area 95B in the RAM 43 as print text data and ends the sub-processes. The CPU 41 then returns the flow to the main flow chart and shifts to process S17.

If the print button 98 has been clicked with the mouse 7 or alternatively, if the area outside the edit area 95B is clicked with the mouse 7, the CPU 41 shrinks the capture window 95 to its original size with the drop area 95A displayed at a central part thereof, and displays the capture button 96 in place of the print button 98. For instance, the capture window 95 shown in the top first image in FIG. 19 is displayed at any of the side edge portions of the display screen in the display 5.

Next, as shown in FIG. 11, at S17, the CPU 41 executes a judgment process of judging whether or not text printing has started, specifically, whether or not the print button 98 of the capture window 95 has been clicked with the mouse 7.

If the print button 98 of the capture window 95 has been clicked with the mouse 7 (S17: YES), the CPU 41 shifts the flow to process S18.

At S18, after executing the sub-processes of the [text print process], the CPU 41 executes the processes following S15 once again.

Here, the sub-processes of the [text print process] will be described based on FIG. 14, and FIG. 19 through FIG. 23.

Figure 14:
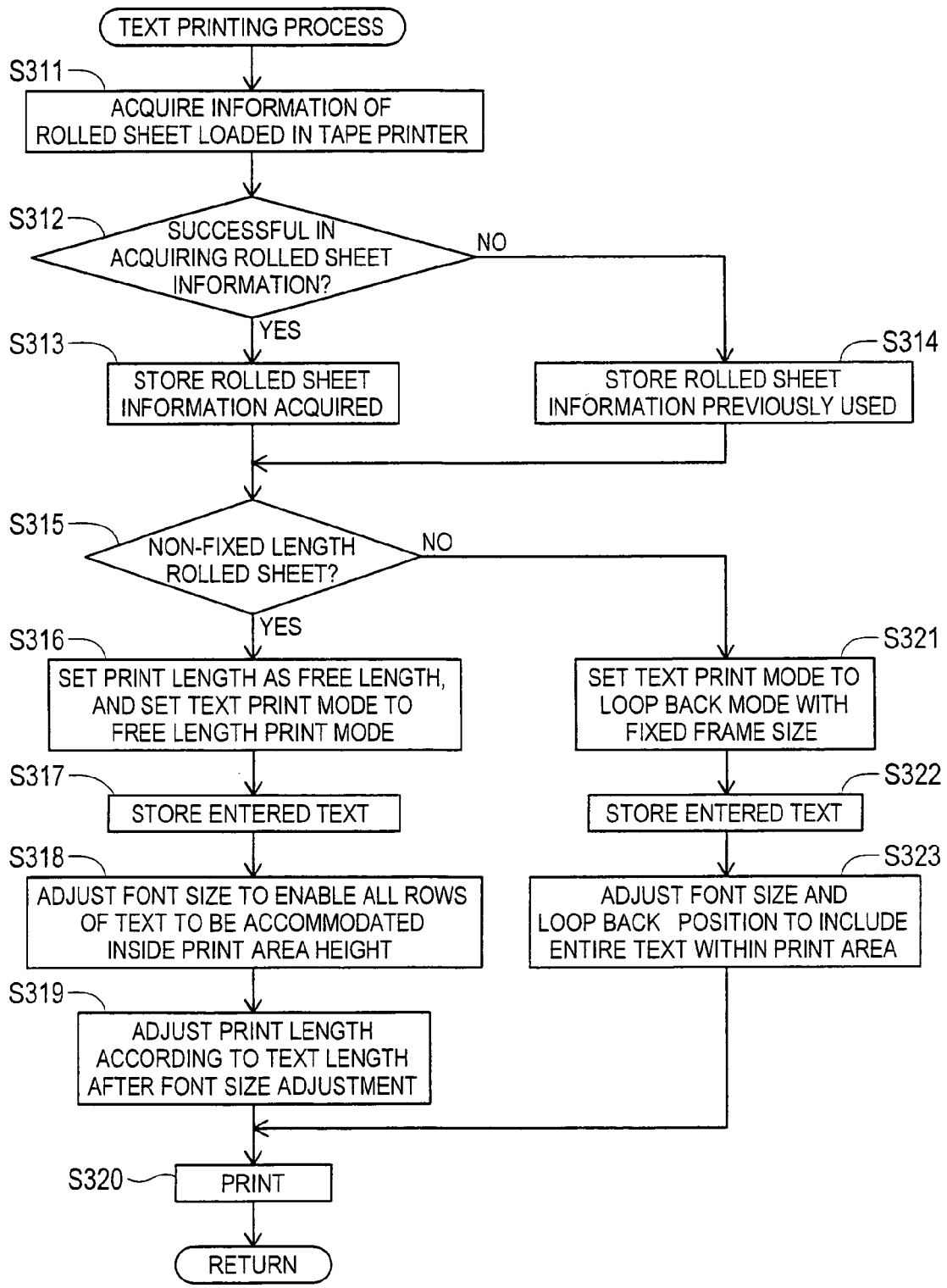
FIG. 14 is a sub-flow chart showing sub-processes of the [text printing process] as shown in FIG. 11.

As shown in FIG. 14, at S311, the CPU 41 acquires information with respect to the type (non-fixed length rolled sheet, die cut, or the like) and width of the rolled sheet 12A which is loaded in the tape printer 3, from the CPU 71 of the tape printer 3, through the communication interface 45.

Next, at S312, the CPU 41 executes a judgment process of judging whether information with respect to the rolled sheet 12A could be acquired from the tape printer 3. If information concerning the rolled sheet 12A could be acquired from the tape printer 3 (S312: YES), the CPU 41 shifts the flow to process S313. At S313, the CPU 41 stores the information with respect to the rolled sheet 12A as acquired from the tape printer 3 in the HDD 49 as information with respect to the rolled sheet onto which text will be printed. Then, the flow shifts to process S315.

For instance, if the rolled sheet 12A is the non-fixed length rolled sheet, a message containing this information and the sheet width are stored in the HDD 49 as information with respect to the rolled sheet 12A. If the rolled sheet 12A is die cut, a message containing this information and the width and length dimensions of the die cut label are stored in the HDD 49 as information with respect to the rolled sheet 12A.

Alternatively, if information with respect to the rolled sheet 12A cannot be acquired from the tape printer 3 (S312: NO), the CPU 41 shifts the flow to process S314. At S314, the CPU 41 reads out information with respect to the rolled sheet 12A which was last used to print the text from the HDD 49 and then stores this as information with respect to the rolled sheet 12A onto which text will be printed. After this, the flow shifts to process S315.

Next, at S315, the CPU 41 executes a judgment process wherein the CPU 41 reads out the information with respect to the rolled sheet 12A onto which text will be printed from the HDD 49 and judges whether or not the rolled sheet 12A is a non-fixed length rolled sheet. If the rolled sheet 12A is a non-fixed length rolled sheet (S315: YES), the CPU 41 shifts the flow to process S316. At S316, the CPU 41 sets the print mode for text to free length print mode, wherein the length of the label sheet to be printed is a free length.

At S317, the CPU 41 reads out the print text data which was stored in the RAM 43 in the process at S213 and stores it again in the RAM 42 as print text data to be printed on the non-fixed length rolled sheet 12A.

Next, at S318, the CPU 41 reads out the sheet width of the non-fixed length rolled sheet 12A from the HDD 49 and decides the height of the print area 91A as shown in FIG. 15, after which it stores the result in the RAM 43. The CPU 41 calculates the maximum font size of the text in all rows, corresponding to print text data, which can; be accommodated inside the height of the print area 91A and stores this in the RAM 43 as the font size for printing print text data.

Then, at S319, the CPU 41 calculates the length of the print area 91A so as to allow the text in all rows, corresponding to print text data, to fit inside the print area 91A with the font size for printing the print text data as calculated at S318, and stores the result in the RAM 43.

Next, at S320, the CPU 41 reads out the print text data and the respective data concerning the font size at which the print text data is printed and the height and length of the print area 91A from the RAM 43, and then transmits the data to the tape printer 3 together with the print command. Then, the CPU 41 ends the sub-processes and returns the flow to the main chart, where the processes following S15 are executed once again. As a result, a label sheet is created onto which print text data which is entered to the edit area 95B is printed at a maximum font size on the non-fixed length rolled sheet 12A.

Figure 20:
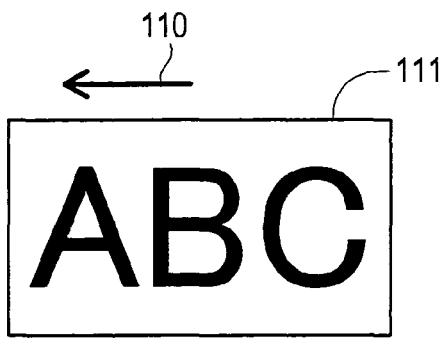
FIG. 20 is a view showing one example of printing text in the case of a non-fixed length rolled sheet.
Figure 21:
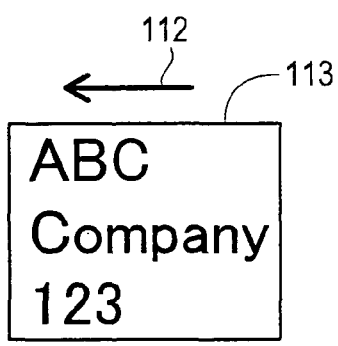
FIG. 21 is a view showing one example of printing text in the case of a non-fixed length rolled sheet.

Here, one example of the label sheet which is created in the case that the non-fixed length rolled sheet 12A is loaded in the tape printer 3 will be described based on FIG. 19 through FIG. 21.

For instance, if the non-fixed length rolled sheet 12A (sheet width being 29 mm) is loaded in the tape printer 3 and the print button 98 is clicked with the mouse 7, with the capture window 95 as shown in the fourth image from the top in FIG. 19, the CPU 41 reads out print text data such as [ABC] and respective data concerning the font size at which [ABC] is printed, the height and length of the print area 91A, and transmits the data to the tape printer 3 together with the print command. As a result, a printed label sheet 111 is formed along a conveying direction 110 wherein the text [ABC] is printable at a maximum font size in the print area of the non-fixed length rolled sheet 12A, as shown in FIG. 20.

For instance, if the non-fixed length rolled sheet 12A (sheet width being 29 mm) is loaded in the tape printer 3 and the print button 98 is clicked with the mouse 7, with the capture window 95 as shown in the fifth image from the top in FIG. 19, the CPU 41 reads out, from the RAM 43, three rows of print text data including [ABC], [Company] and [123] and respective data concerning the font size at which the three rows of print text data is to be printed, the height and length of the print area 91A and, transmits this data to the tape printer 3 together with the print command. As a result, a printed label sheet 113 is formed along a conveying direction 112 wherein the tree rows of text including [ABC], [Company] and [123] are printable at a maximum font size in the print area of the non-fixed length rolled sheet 12A, as shown in FIG. 21.

Alternatively, as shown in FIG. 14, if the rolled sheet 12A which was loaded in the tape printer 3 at S315 is other than the non-fixed length rolled sheet, specifically, in case of a die cut (S315: NO), the CPU 41 shifts the flow to process S321. At S321, the CPU 41 sets the print mode for the text to a loop back mode with a fixed frame size, using a die cut label as the label sheet to be printed.

At S322, the CPU 41 reads out the print text data stored in the RAM 43 in the process at S216 and stores this data again in the RAM 43 as print text data to be printed on the die cut label.

Next, at S323, the CPU 41 reads out the width dimension and the length dimension of the die cut label from the HDD 49 and calculates the maximum font size and the loop back position at which the text can be fitted in the print area of this die cut label by causing the entire text for the print text data loop back. The CPU 41 then stores this data in the RAM 43 as the font size at which the print text data will be printed and the loop back position at the time of printing, after which the flow shifts to process S320. If a line break is included in the print text data, this line break position is handled as the loop back position at the time of printing.

At S320, the CPU 41 reads out, from the RAM 43, print text data and various data concerning the font size at which the print text data is to be printed and the loop back position at the time of printing and transmits this data in the tape printer 3 together with the print command. After this, the CPU 41 ends the sub-processes and returns the flow to the main flow chart where the processes following S15 are executed once again. As a result, a label sheet is created onto which the print text data which was entered in the edit area 95B is printed at a maximum font size on the die cut label.

Figure 22:
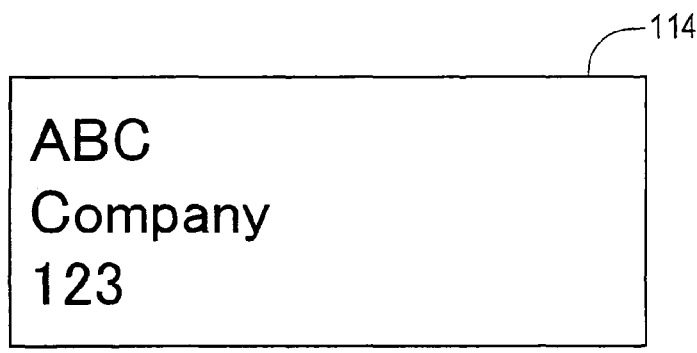
FIG. 22 is a view showing one example of printing text in the case of a die cut.
Figure 23:
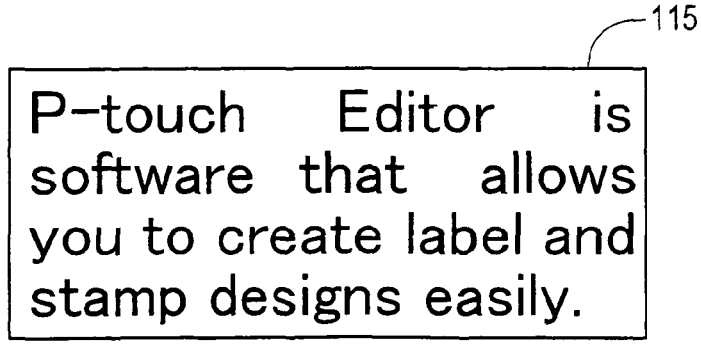
FIG. 23 is a view showing one example of printing text in the case of a die cut.

Here, one example of the label sheet which is created in the case that the die cut is loaded in the tape printer 3 will be described based on FIG. 19, FIG. 22 and FIG. 23.

For instance, if a die cut rolled sheet 12A (for instance, the dimensions of the die cut label are 29 mm×90 mm) is loaded in the tape printer 3, and the print button 98 is clicked with the mouse 7, with the capture window 95 being as shown in the fifth image from the top in FIG. 19, the CPU 41 reads out, from the RAM 43, three rows of print text data including [ABC], [Company] and [123] and respective data concerning the font size at which the three rows of print text data is to be printed, and the loop back position at which each line break position is handled as loop back position at the time of printing, and transmits this data to the tape printer 3 together with the print command. As a result, a label sheet 114 is formed wherein the three rows of text including [ABC], [Company] and [123] are printed along a length direction of the die cut label at a maximum font size at which the text is printable in the print area of die cut label, as shown in FIG. 22.

For instance, the die cut rolled sheet 12A (for instance, dimensions of the die cut label are 29 mm×90 mm) is loaded in the tape printer 3 and the print button 98 is clicked with the mouse 7 in the state that message [P-touch Editor is software that allows you to create label and stamp designs easily.] is entered as print text data in the edit area 95B. In this case, the CPU 41 calculates the rear end of the respective text [is], [allows] and [and] as the loop back position at the time of printing and at the same time calculates the maximum font size at which the entire text will be printed on the die cut label. Then, the CPU 41 stores this data in the RAM 43.

The CPU 41 reads out, from the RAM 43, the print text data and various data concerning the font size at which the print text data will be printed and the loop back position at the time of printing and then transmits this data to the tape printer 3 together with the print command. As a result, a label sheet 115 is formed wherein the entire text [P-touch Editor is software that allows you to create label and stamp designs easily.] is printed at a maximum font size at which the text is printable in the print area of die cut label, as shown in FIG. 22.

Alternatively, as shown in FIG. 11, at S15, if text input is not started by using the text print function, specifically, if the drop area 95A of the capture window 95 is not clicked with the mouse 7 (S15: NO), the CPU 41 shifts the flow to process S19. At S17, if the print button 98 of the capture window 95 is not clicked with the mouse 7, specifically, if the area outside the edit area 95B is clicked with the mouse 7 at S216 (S17: NO), the CPU 41 shifts the flow to process S19.

At S19, the CPU 41 executes a judgment process of judging whether or not the capture button 96 of the capture window 95 has been clicked with the mouse 7. If the capture button 96 is clicked with the mouse 7 (S19: YES), the CPU 41 shifts the flow to process S20. At S20, the CPU 41 captures the rectangular area which was selected from the data displayed on the display 5 by making a click with the mouse 7, as bitmap image data, after the capture window 95 is deleted from the display screen, and then stores this data in the RAM 43.

At S21, after displaying the layout edit window 89 (refer to FIG. 15) on the display screen of the display 5, the CPU 41 fits and displays the bitmap image shaped as a rectangular area selected by a click with the mouse 7. After layout editing, the process is ended.

Alternatively, if the capture button 96 is not clicked with the mouse 7 at S19 (S19: NO), the CPU 41 shifts the flow to process S22. At S22, the CPU 41 executes a judgment process of judging whether or not the edit return button 99 of the capture window 95 has been clicked with the mouse 7, specifically, whether or not a command was issued to end the capture application and return to the layout edit window 89.

If the edit return button 99 of the capture window 95 is clicked with the mouse 7 (S22: YES), the CPU 41 shifts the flow to process S21. After layout editing by displaying the layout edit window 89 (refer to FIG. 15) on the display 5, the CPU 41 ends the process.

Alternatively, if the edit return button 99 of the capture window 95 is not clicked with the mouse 7 (S22: NO), the CPU 41 shifts the flow to process S23. At S23, the CPU 41 carries out a judgment process of judging whether or not an object of another application was dragged and dropped in the drop area 95A.

If an object of another application was dragged and dropped in the drop area 95A (S23: YES), the CPU 41 shifts the flow to process S21 where the layout edit window 89 (refer to FIG. 15) is displayed in the display screen of the display 5. Then, the CPU 41 reads out the dropped object from the object information storage area 43A and displays the object by fitting it in the print area 91A. Then, after layout editing, the CPU 41 ends the process.

Alternatively, if an object of another application is not dragged and dropped in the drop area 95A (S23: NO), the CPU 41 shifts the flow to process S24. At S24, the CPU 41 executes a judgment process of judging whether or not the completion button 97 of the capture window 95 has been clicked with the mouse 7, specifically, whether or not a command was issued to delete the capture window 95 from the display screen.

If the completion button 97 of the capture window 95 is not clicked with the mouse 7 (S24: NO), the CPU 41 executes the processes following S15 once again.

Alternatively, if the completion button 97 of the capture window 95 is clicked with the mouse 7 (S24: YES), the CPU 41 deletes the capture window 95 from the display screen and ends the process.

As was described in detail earlier, in the label printing system 1 according to the present embodiment, if the capture application activate button 93 which is displayed on the layout edit window 89 is clicked with the mouse 7, the CPU 41 of the computer device 2 activates the capture application and deletes the layout edit window 89. The capture window 95 is thus caused to blink three times by being displayed at any side edge portion of the display screen. If the drop area 95A of the capture window 95 is clicked with the mouse 7 to input text through the keyboard 6, the CPU 41 extends the capture window 95 in a latitudinal direction. At the same time, the CPU 41 changes the drop area 95A to the edit area 95B wherein the text characters which were entered from the keyboard 6 are displayed. The CPU 41 changes the capture button 96 to the print button 98 for entering a text print command. If the print button 98 is clicked with the mouse 7, the CPU 41 outputs the text displayed on the edit area 95B to the tape printer 3 as print data (S11 through S18).

As a result, it is possible to create label data including text only to be printed on the non-fixed length rolled sheet 12A or the die cut through a simple operation by changing the drop area 95A of the capture window 95 to edit area 95B, while the capture window 95 is being displayed, specifically, with the capture application being activated. Because the label data including text only is outputted as print data to the tape printer 3, a label sheet onto which text only is printed can be quickly created, while the capture application is in an activated state.

When text is displayed on the edit area 95B, the capture window 95 is displayed so as to extend in a latitudinal direction and the edit area 95B is displayed so as to extend in a latitudinal direction, which makes it possible to easily enter text trough the keyboard 6. Thus, the capture window 95 can be displayed in a smaller size with the drop area 95A formed therein.

The CPU 41 extends the edit area 95B in a longitudinal direction by one row each time the line break key of the keyboard 6 is depressed and causes the cursor 105 to blink at the head of the next row. This makes it possible to secure an area required for entering text and display the entire text that was entered.

Text which is displayed in the edit area 95B is outputted to the tape printer 3 as print data by making a click with the mouse 7 on the print button 98 displayed on the capture window 95. This makes it possible to quickly create the label sheet for printing text only.

The print mode (for instance, free length print mode and fixed frame loop back print mode) for the text which is displayed on the edit area 95B is set based on the type (for instance, the type of the non-fixed length rolled sheet and die cut, etc.) of the rolled sheet 12A loaded in the tape printer 3. The text that was entered can thus be printed in a suitable manner on the non-fixed length rolled sheet 12A or the die cut which was loaded in the tape printer 3 simply by entering text in the edit area 95B.

If a capture application exhibiting the screen capture function, the drag-and-drop function and the text print function is activated, a capture window 95 showing that the capture application is activated is displayed with three blinks when it is initially displayed. Thus, the user can easily recognize the capture window 95, even if this window is small. The image of the capture window 95 and the background image are subjected to alpha blending, causing the capture window 95 to blink three times. This makes it possible to easily switch the display state of the capture window 95.

The disclosure is not limited to the above-described embodiment and various improvements and modifications can be made thereto without departing from the spirit of the disclosure.

What is claimed is:

1. A label data creating apparatus comprising:
 a display having a display screen; and
 a print-data creating and editing unit that creates and edits print data to be printed out on a long print medium, the print data being created and edited by displaying in the display screen a layout edit screen that virtually indicates a print area of the long print medium, wherein
 the print-data creating and editing unit comprises:
 an application storage device that stores an application to edit data including text or image information by inserting the data in the print area of the long print medium;
 a display control unit that performs control so that the display screen enabling a drag-and-drop operation of the data is displayed on the display by deleting the layout edit screen therefrom, in a case where the application has been activated;
 a window display unit that constantly displays a window showing the application has been activated, in forefront at an inner periphery of the display screen from which the layout edit screen has been deleted, the window performing two functions of a drop area for dragging and dropping the data and an edit area for showing text, the window having a substantially rectangular shape long in a latitudinal direction;
 an input device that is used in inputting text;
 a function-change unit that changes a function of the window to the edit area displaying text which was entered through the input device in a case where the window is clicked with a mouse, and changes the function of the window to the drop area in a case where the data is dragged and dropped in the window; and
 an output control unit that performs control so that text which was entered through the input device is displayed on the window functional as the edit area as the print data in a case where the function of the window is changed to the edit area, and so that the function of the window is changed to the drop area and thereby the data is virtually displayed in the print area by displaying again the layout edit screen that virtually indicates the print area of the print medium, in a case where the data is dragged and dropped on the window.

2. The label data creating apparatus according to claim 1, wherein the print-data creating and editing unit further comprises an extension display unit that displays the window by extending the window in a latitudinal direction, in a case where the window functions as the edit area and text is displayed in the edit area.

3. The label data creating apparatus according to claim 2, wherein if a line break command is entered from the input device or the entered text cannot be fitted inside the window functioning as the edit area, the extension display unit displays the window so as to be extended in a longitudinal direction based on the line break command or the entered text.

4. The label data creating apparatus according to claim 1,
 wherein the print-data creating and editing unit further comprises a print button display unit that displays a print button on the window, in case text has been displayed on the window functioning as the edit area, and
 wherein if the print button is clicked, the output control unit performs control so that the text displayed on the window functioning as the edit area is outputted to the printer as print data.

5. The label data creating apparatus according to claim 1,
 wherein the print-data creating and editing unit further comprises a type acquisition unit that acquires from the printer, the type of the print medium which is loaded in the printer; and
 wherein the output control unit sets the print mode for the text displayed on the window functioning as the edit area based on the type of the print medium acquired by the type acquisition unit.

6. The label data creating apparatus according to claim 1,
wherein the print-data creating and editing unit further comprises a display state change unit that displays a display state of the window at least at the initial display of the window by subjecting an image of the window and a background image to alpha blending and causing the window to blink by a predetermined number of times; and wherein if the data is dropped at a position at which the window is displayed, the dropped data is inserted in the print area which is currently being edited.

7. A label data creating method comprising:
a display control step of performing control, in a case where an application of editing data including text or image data by inserting the data in a print area of a long print medium is activated, so that a display screen enabling a drag-and-drop operation of the data is displayed on a display by deleting from the display screen a layout edit screen that virtually indicates the print area of the long print medium;

a window display step of constantly displaying a window that shows the application has been activated, in forefront at an inner periphery of the display screen from which the layout edit screen displayed in the display control step has been deleted, the window performing two functions of a drop area for dragging and dropping the data and an edit area for showing text, the window having a substantially rectangular shape long in a latitudinal direction;

a function changing step of changing a function of the window to the edit area displaying text which was entered through an input device in a case where the window displayed in the window display step is clicked with a mouse, and changing the function of the window to the drop area in a case where the data is dragged an dropped in the window; and an output control step of performing control, so that text which was entered through the input device is displayed on the window functioning as the edit area as print data in a case where the function of the window is changed to the edit area in the function changing step, and so that the function of the window is changed to the drop area in the function changing step, and so that the function of the window is changed to the drop area and thereby the data is virtually displayed in the print area of the layout edit screen by displaying again the layout edit screen that virtually indicates the print area of the print medium in a case where the data is dragged and dropped on the window.

8. The label data creating method according to claim 7, further comprising an extension display step of displaying the window by extending the window in a latitudinal direction, in a case where the window functions as the edit area and text is displayed in the edit area in the function changing step.

9. The label data creating method according to claim 8, wherein, in the extension display step, if a line break command is entered from the input device or the entered text cannot be fitted in the window functioning as the edit area, the window is displayed so as to be extended in a longitudinal direction based on the line break command or the entered text.

10. The label data creating method according to claim 7, further comprising:
a print button display step of displaying a print button on the window if text has been displayed on the window functioning as the edit area in the function changing step, wherein, in the output control step, if the print button displayed in the print button display step has been clicked, control is performed so that the text displayed on the window functioning a the edit area is outputted to the printer as print data.

11. The label data creating method according to claim 7, further comprising:
a type acquisition step of acquiring, from the printer, the type of the print medium which is loaded in the printer, wherein in the output control step, a print mode for the text displayed on the window functioning as the edit area is based on the type of the print medium acquired in the type acquisition step.

12. The label data creating method according to claim 7, further comprising:
a display state changing step of displaying a display state of the window at least when the window displayed in the window display step is initially displayed by subjecting an image of the window and a background image to alpha blending and causing the window to blink by a predetermined number of times; and wherein if the data is dropped at a position at which the window is displayed in the window display step, the dropped data is inserted in the print area which is currently being edited.

13. A computer program product used and executed by a label data creating apparatus comprising:
a non-transitory computer readable recording medium; and
a computer program stored in the non-transitory computer readable recording medium, wherein the computer program includes:

a display control step of performing control, in a case where an application of editing data including text or image data by inserting the data in a print area of a long print medium is activated, so that a display screen enabling a drag-and-drop operation of the data is displayed on a display by deleting from the display screen a layout edit screen that virtually indicates the print area of the long print medium;

a window display step of constantly displaying a window that shows the application has been activated, in forefront at an inner periphery of the display screen from which the layout edit screen displayed in the display control step has been deleted, the window performing two functions of a drop area for dragging and dropping the data and an edit area for showing text, and the window having a substantially rectangular shape long in a latitudinal direction;

a function changing step of changing a function of the window to the edit area displaying text which was entered through an input device in a case where the window displayed at the window display step is clicked with a mouse, and changing the function of the window to the drop area in a case where the data is dragged and dropped in the window; and an output control step of performing control so that text which was entered through the input device is displayed on the window functioning as the edit area as print data in a case where the function of the window is changed to the edit area in the function changing step, and so that the function of the window is changed to the drop area and thereby the data is virtually displayed in the print area of the layout edit screen by displaying again the layout edit screen that virtually indicates the print area of the print medium in a case where the data is dragged and dropped on the window.

14. The computer program product according to claim 13, wherein the computer program further includes:
an extension display step of displaying the window by extending the window in a latitudinal direction, in a case where the window functions as the edit area and text is displayed in the edit area in the function changing step.

15. The computer program product according to claim 14, wherein, in the extension display step, if a line break command is entered from the input device or the entered text cannot be fitted in the window functioning as the edit area, the window is displayed so as to be extended in a longitudinal direction based on the line break command or the entered text.

16. The computer program product according to claim 13, wherein the computer program further includes:
a print button display step of displaying a print button on the window if text has been displayed on the window functioning as the edit area in the function changing step,
wherein, in the output control step, if the print button displayed in the print button display step has been clicked, control is performed so that the text displayed on the window functioning as the edit area is outputted to the printer as print data.

17. The computer program product according to claim 13, wherein the computer program further includes:
a type acquisition step of acquiring, from the printer, the type of the print medium which is loaded in the printer,
wherein in the output control step, a print mode for the text displayed on the window functioning as the edit area is set based on the type of the print medium acquired in the type acquisition step.

18. The compute program product according to claim 13, wherein the computer program further includes:
a display state changing step of displaying a display state of the window at least when the window displayed in the window display step is initially displayed by subjecting an image of the window and a background image to alpha blending and causing the window to blink by a predetermined number of times; and
wherein if the data is dropped at a position at which the window is displayed in the window display step, the dropped data is inserted in the print area which is currently being edited.

\* \* \* \* \*